(12) United States Patent
Ichitani

(10) Patent No.: US 7,787,149 B2
(45) Date of Patent: Aug. 31, 2010

(54) METHOD OF GENERATING COLOR CONVERSION TABLE, INFORMATION GENERATION APPARATUS, RECORDING MEDIUM, AND IMAGE PROCESSING APPARATUS

(75) Inventor: Shuji Ichitani, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1079 days.

(21) Appl. No.: 11/487,488

(22) Filed: Jul. 17, 2006

(65) Prior Publication Data

US 2007/0223016 A1 Sep. 27, 2007

(30) Foreign Application Priority Data

Mar. 23, 2006 (JP) .............................. 2006-081469

(51) Int. Cl.
*G03F 3/08* (2006.01)
(52) U.S. Cl. ....................................... 358/1.9; 358/521
(58) Field of Classification Search .................. 358/1.1, 358/1.9, 3.23, 500, 501, 518, 521, 523
See application file for complete search history.

(56) References Cited

U.S. PATENT DOCUMENTS 6,714,673 B1 * 3/2004 Ohta ........................... 382/167

FOREIGN PATENT DOCUMENTS

JP 7-236069 9/1995

* cited by examiner

*Primary Examiner*—Thomas D Lee
(74) *Attorney, Agent, or Firm*—Finnegan, Henderson, Farabow, Garrett & Dunner, LLP

(57) ABSTRACT

A color conversion table for converting M color signals of an input system into N color signals of an output system is disclosed. The color conversion table is prepared by and obtained based on a calculation target point corrected by moving a position of the maximum gradation of each fundamental color of the output system to a position of the maximum gradation of the fundamental color of the input system and on calculation target points corrected for gradations other then the maximum gradation of each fundamental color by moving positions of the gradations of the fundamental color in output system to the positions of the gradations of the fundamental color in the input system.

6 Claims, 32 Drawing Sheets

FIG. 25 (A)

Cyan

| | R | G | B |
|---|---|---|---|
| 1 | 255 | 255 | 255 |
| 2 | 223 | 255 | 255 |
| 3 | 191 | 255 | 255 |
| 4 | 159 | 255 | 255 |
| 5 | 128 | 255 | 255 |
| 6 | 96 | 255 | 255 |
| 7 | 64 | 255 | 255 |
| 8 | 32 | 255 | 255 |
| 9 | 0 | 255 | 255 |

FIG. 25 (B)

Red

| | R | G | B | |
|---|---|---|---|---|
| 1 | 255 | 255 | 255 | White |
| 2 | 255 | 223 | 223 | |
| 3 | 255 | 191 | 191 | |
| 4 | 255 | 159 | 159 | |
| 5 | 255 | 128 | 128 | |
| 6 | 255 | 96 | 96 | |
| 7 | 255 | 64 | 64 | |
| 8 | 255 | 32 | 32 | |
| 9 | 255 | 0 | 0 | Red |

FIG. 26 (A)

Magenta

|   | R   | G   | B   |
|---|-----|-----|-----|
| 1 | 255 | 255 | 255 |
| 2 | 255 | 223 | 255 |
| 3 | 255 | 191 | 255 |
| 4 | 255 | 159 | 255 |
| 5 | 255 | 128 | 255 |
| 6 | 255 | 96  | 255 |
| 7 | 255 | 64  | 255 |
| 8 | 255 | 32  | 255 |
| 9 | 255 | 0   | 255 |

FIG. 26 (B)

Green

|   | R   | G   | B   |       |
|---|-----|-----|-----|-------|
| 1 | 255 | 255 | 255 | White |
| 2 | 223 | 255 | 223 |       |
| 3 | 191 | 255 | 191 |       |
| 4 | 159 | 255 | 159 |       |
| 5 | 128 | 255 | 128 |       |
| 6 | 96  | 255 | 96  |       |
| 7 | 64  | 255 | 64  |       |
| 8 | 32  | 255 | 32  |       |
| 9 | 0   | 255 | 0   | Green |

FIG. 27 (A)

Yellow

|   | R | G | B |
|---|---|---|---|
| 1 | 255 | 255 | 255 |
| 2 | 255 | 255 | 223 |
| 3 | 255 | 255 | 191 |
| 4 | 255 | 255 | 159 |
| 5 | 255 | 255 | 128 |
| 6 | 255 | 255 | 96 |
| 7 | 255 | 255 | 64 |
| 8 | 255 | 255 | 32 |
| 9 | 255 | 255 | 0 |

FIG. 27 (B)

Blue

|   | R | G | B |
|---|---|---|---|
| 1 | 255 | 255 | 255 |
| 2 | 223 | 223 | 255 |
| 3 | 191 | 191 | 255 |
| 4 | 159 | 159 | 255 |
| 5 | 128 | 128 | 255 |
| 6 | 96 | 96 | 255 |
| 7 | 64 | 64 | 255 |
| 8 | 32 | 32 | 255 |
| 9 | 0 | 0 | 255 |

ACTUAL GRADATION IS NOT A STRAIGHT LINE

↓ ACTUALLY

METHOD OF GENERATING COLOR CONVERSION TABLE, INFORMATION GENERATION APPARATUS, RECORDING MEDIUM, AND IMAGE PROCESSING APPARATUS

This application is based on Japanese Patent Application No. 2006-081469 filed on Mar. 23, 2006, in Japanese Patent Office, the entire content of which is hereby incorporated by reference.

TECHNICAL FIELD

The present invention relates to methods of generating a color conversion table for converting the colors of M input color signals into N output color signals, information generation apparatuses for generating such a table, recording medium, and image processing apparatuses provided with the recording medium.

BACKGROUND

In recent years, the use of scanners, monitors (color display devices), color printers, color copying machines, and all-in-one units having these is increasing. This type of color image forming apparatuses are often equipped with a three-dimensional color information conversion table (a three-dimensional look Up table, also referred to hereinafter as RGB→CMYK3D-LUT) that converts the image information of signal processing system of the colors red (R), green (G), and blue (B) into an image data of the CMYK signal processing system. This is because, in the image forming apparatus, the configuration is such that the operations are made based on image data of the CMYK signal processing system.

The RGB→CMYK3D-LUT is prepared, for example, from the measured color values (XYZ or Lab) of the original document with $n^3$ patches in which n patches are arranged so that the intensity of each of the three colors RGB increases, and from the scanner signal (RGB) by carrying out matrix processing and interpolation computation processing, and the RGB→CMYK3D-LUT is for converting the RGB signals to XYZ output signals or Lab output signals.

Relating to the image forming apparatus handling the above described color image data, an image processing apparatus has been disclosed in Japanese Unexamined Laid-Open Patent Publication No. H07-236069. According to this image processing apparatus, the color image data inputted from the input device is subjected to color gamut compression processing to suit the color reproduction region of the output device, and the output image data after this color gamut compression is outputted to the output device.

FIG. 32 is a flow chart showing an example of preparing the RGB→CMYK3D-LUT of a conventional example. To begin with, in Step R1 in the flow chart shown in FIG. 32, the input data and the Lab data are read out from the prescribed image memory and expanded in the RAM (Random Access Memory), etc. The input data and the Lab data are expanded in the RAM and the RGB→Lab3D-LUT is prepared.

Next, in Step R2, the CMY data is read in from the image memory and expanded in the RAM. The CMY data is expanded in the RAM and the CMYK→Lab4D-LUT is prepared. Next, the operation moves on to Step R3 in which the CMY→Lab3D-LUT is prepared from the CMYK→Lab4D-LUT based on a GCR (Gray-Component Replacement) algorithm.

Thereafter, the operation moves on to Step R4 in which the Lab value to calculate in the Lab coordinate system is set. At this time, the CMY value corresponding to each of the Lab values of RGB→Lab3D-LUT is computed from the CMY→Lab3D-LUT. Next, the operation moves on to Step R5 in which the Lab values set (inputted) earlier are searched from the CMY→Lab3D-LUT, and a judgment is made as to whether or not the Lab value is within the color gamut of the CMY→Lab3D-LUT (color gamut inside or outside judgment process). When the calculation target point Pin is judged, by this color gamut inside or outside judgment process, to be outside the color gamut of the printer, the operation moves on to Step R6 in which the compression process is executed.

Further, in Step R5 described above, if the calculation target point Pin is judged to be within the color gamut of the printer, the operation moves on to Step R7 in which the CMY values are searched in the CMY→Lab3D-LUT using the Lab value set earlier by inclusion judgment, and the CMY values are calculated corresponding to this inclusion judgment. Thereafter, the operation moves on to Step R8 in which a judgment is made as to whether or not all the computation processing of the CMY values corresponding to the Lab value set earlier has been completed.

If all the computation has not been completed, the operation returns to Step R4 and the processing described above is repeated. If the computation processing of the CMY values for all the Lab values that have been inputted earlier is completed, the RGB→CMY3D-LUT is prepared. Next, the operation moves on to Step R9 in which the RGB→CMY3D-LUT is converted to the RGB→CMYK3D-LUT by the GCR. In this manner it is possible to prepare the RGB→CMYK3D-LUT (this is referred to hereafter as the conventional example 1).

However, the following problems are present in an image processing apparatus according to a conventional example.

i. In an image processing apparatus as in the Japanese Laid-Open Patent Publication or in the conventional example 1, regarding the reproduction of the six fundamental colors of RGBCMY, as a method of eliminating color mixing, there is the method of moving the fundamental color point of the input side to the output side, and carrying out linear interpolation for other parts (hereinafter referred to as the conventional example 2). In FIG. 33(A), the filled circles denote the fundamental color gradations on the input side. The open circles are the gradations on the fundamental color output side. In actuality, the fundamental color gradation is not as indicated by a straight line in FIG. 33(A) but is non-linear as indicated in FIG. 33(B).

Because of this movement and linear interpolation, regarding the reproduction of fundamental colors, although in appearance it is thought that color mixing is eliminated, the actual color gradations of printers and scanners are usually not linear in the Lab space, but are bent as shown in FIG. 33(B). As a consequence, the method of moving the fundamental colors and carrying out linear interpolation for other parts results in color mixing with the intermediate gradation parts of fundamental colors not matching as is shown in FIG. 34(A) and FIG. 34(B). In the conventional example 2, the filled circles denote the fundamental color gradations on the input side. The open circles are the gradations on the fundamental color output side. In actuality, the fundamental color gradation is not as indicated by a straight line in FIG. 34(A) but is non-linear as indicated in FIG. 34(B). In other words, even the maximum gradation of the output side fundamental color is made to match with the maximum gradation of the input side fundamental color, there will be a difference in the color gamuts of the input side fundamental colors and the color gamuts of the output side fundamental colors. In FIG. 34(B), the horizontal axis corresponds to the color saturation a* of magenta (M) color and the vertical axis corresponds to the color saturation b* of yellow (Y) color. Therefore, although the fundamental color points match, other gradations do not necessarily match. This becomes the cause of color mixing.

ii. When color mixing of other colors occurs in the reproduction of fundamental colors, not only the image is bad to see, but also can cause wasteful consumption of the toner. For example, when reproducing the fundamental color R, instead of being reproduced using only colors Y and M, if the color C is also added, the consumption of the toner of that color C will be wasteful.

SUMMARY

In view of forgoing, one embodiment according to one aspect of the present invention is a method for generating a color conversion table for converting M color signals of an input system into N color signals of an output system, comprising the steps of:

correcting, for each fundamental color, a calculation target point by moving a position of the maximum gradation of the fundamental color of the output system to a position of the maximum gradation of the fundamental color of the input system; and correcting, for each gradation other than the maximum gradation of each fundamental color, a calculation target point of the fundamental color of the output system by moving a position of the gradation of the fundamental color of the output system to a position of the gradation of the fundamental color of the input system.

According to another aspect of the present invention, another embodiment is an information generation apparatus for converting M color signals of an input system into N color signals of an output system, comprising:

a correction section which corrects, for each fundamental color, a calculation target point by moving a position of the maximum gradation of the fundamental color of the output system to a position of the maximum gradation of the fundamental color of the input system and corrects, for each gradation other than the maximum gradation of each fundamental color, a calculation target point of the fundamental color of the output system by moving a position of the gradation of the fundamental color of the output system to a position of the gradation of the fundamental color of the input system.

According to another aspect of the present invention, another embodiment is a computer-readable recording medium storing a color conversion table for converting M color signals of an input system into N color signals of an output system, wherein the color conversion table is obtained based on a calculation target point corrected by moving a position of the maximum gradation of each fundamental color of the output system to a position of the maximum gradation of the fundamental color of the input system and on calculation target points corrected for gradations other than the maximum gradation of each fundamental color by moving positions of the gradations of the fundamental color in output system to positions of the gradations of the fundamental color in the input system.

According to another aspect of the present invention, another embodiment is an image processing apparatus, comprising the aforementioned computer-readable recording medium for color converting M color signals of an input system into N color signals of an output system.

BRIEF DESCRIPTION OF THE DRAWINGS

FIGS. 25(A), 25(B) are tabular diagrams showing the relationship (1) between the sample number of the color patch and the color saturation gradation.

FIGS. 26(A), 26(B) are tabular diagrams showing the relationship (2) between the sample number of the color patch and the color saturation gradation.

FIGS. 27(A), 27(B) are tabular diagrams showing the relationship (3) between the sample number of the color patch and the color saturation gradation.

DETAILED DESCRIPTION OF THE PREFERRED EMBODIMENT

Figure 1:
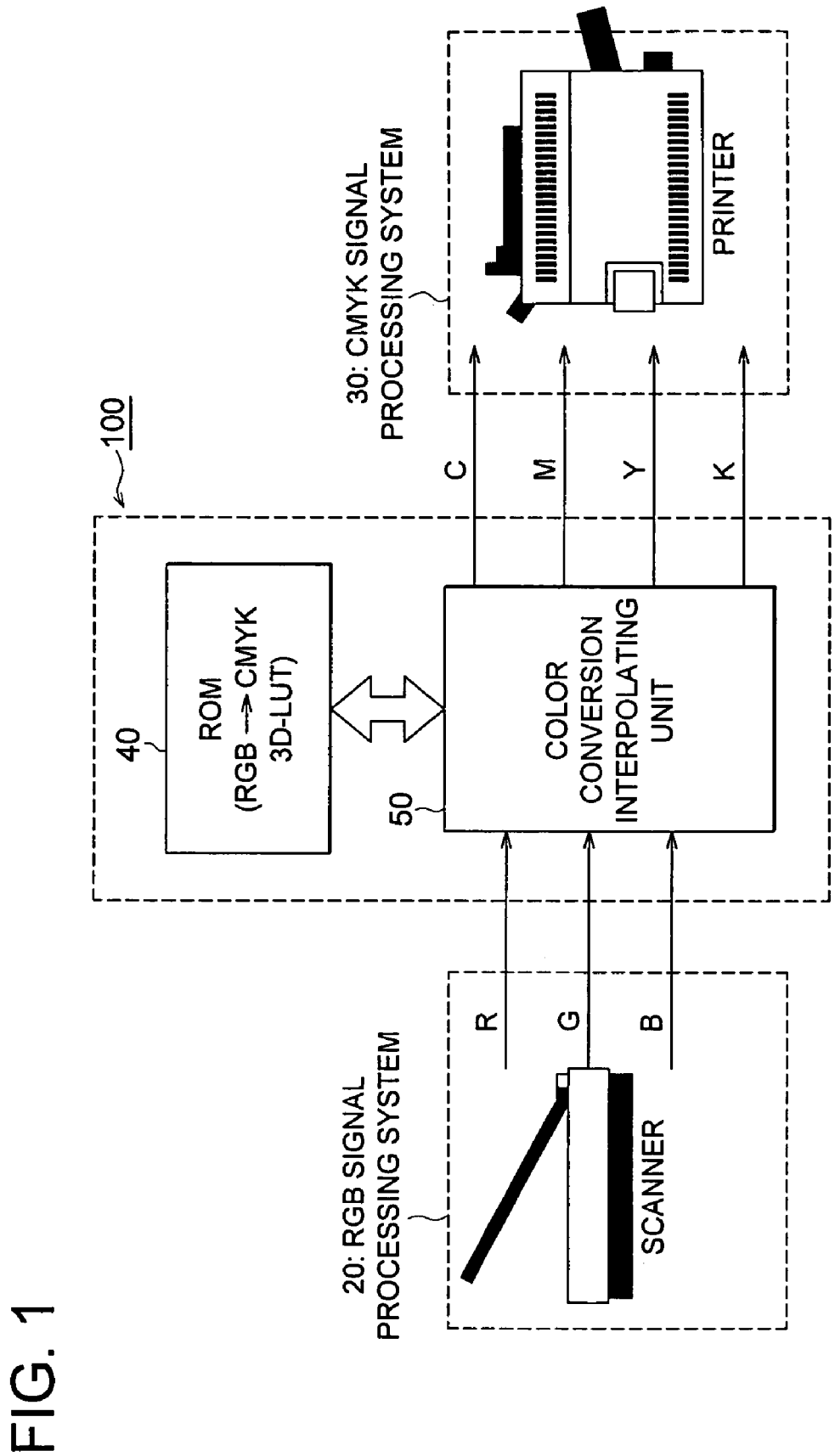
FIG. 1 is a block diagram showing an example of configuration of an image processing apparatus 100 as a preferred embodiment.

The method of generating the color conversion table, the information generation apparatus, the recording medium, and the image processing apparatus according to a preferred embodiment of the present invention are described in the following while referring to the drawings.

FIG. 1 is a block diagram showing an example of configuration of an image processing apparatus 100 as a preferred embodiment. The image processing apparatus 100 shown in FIG. 1 is an apparatus that carries out the conversion processing of the color image signals of the input system 20 with a prescribed number of bits into an N-bit color image signal of the output system 30. In the present example, for example, a scanner is placed in a three dimensional signal processing system of red (R), green (G), and blue (B) which is an example of an input system (hereinafter referred to as the RGB signal processing system 20), and a printer is placed in the four dimensional signal processing system of cyan (C), magenta (M), yellow (Y), and black (K) (hereinafter referred to as the CMYK signal processing system 30) which is an example of an output system.

The image processing apparatus 100 is placed between the scanner and the printer, and, for example, operates so as to convert the color image signals R, G, B of the RGB signal processing system 20 into the color signals C, M, Y, K of the CMYK signal processing system 30. In this example, for the sake of convenience, although the image processing apparatus 100 has been placed between the scanner and the printer, of course, it is also possible to install the image processing apparatus 100 within the scanner, or to install it within the printer. Further, it is also possible that the scanner, image processing apparatus, and the printer are configured integrally as an all-in-one unit.

The image processing apparatus 100 is configured to include a ROM 40 and a color conversion interpolation unit 50. The ROM 40 constitutes an example of a recording medium, and stores the RGB→CMYK3D-LUT. The ROM 40 is one in which is recorded the color conversion table for converting the color image signals R, G, and B of the three color RGB input system into the color image signals C, M, Y, and K of the four color CMYK output system, and the ROM 40 stores the color conversion table computed at the calculation target points at which the position of the maximum gradation of the output system six fundamental colors (each of the colors R, Y, G, C, B, and M) is moved to the position of the maximum gradation of input system six fundamental colors (each of the colors R, Y, G, C, B, and M) and correction is carried out, and computed at the calculation target points at which the positions other than that of the maximum gradation of output system fundamental colors are moved to the positions other than that of the maximum gradation of input system fundamental colors and correction is carried out at each gradation of that output system fundamental colors.

The color conversion interpolation unit 50 is configured so that the N-bit color image signals C, M, Y, K of the CMYK processing system is outputted by interpolating between the color image signals R, G, B with a prescribed number of bits of the RGB signal processing system based on the N-bit CMYK values read out from the ROM 40. The color image signals of the input side signal processing system can also be, apart from RGB signals, CMYK, CMY, Lab, or XYZ signals, etc., and the color image signals of the output side signal processing system can be, apart from CMYK signals, RGB, CMY, Lab, or XYZ signals, etc.

The color conversion interpolation unit 50, for example, is configured so that all the color image signals R, G, B of the RGB signal processing system which is the input system that is outside the printer color gamut and cannot be handled by the CMYK signal processing system 30 which is the output system are color converted and interpolated to the upper limit value or the lower limit value of the printer color gamut handled by that CMYK signal processing system, and the color image signals C, M, Y, K are outputted.

The RGB→CMYK3D-LUT is prepared by executing a step of detecting whether or not the input RGB value of the calculation target point is present outside the printer color gamut of the color image signal handled by the CMYK signal processing system, a step of executing the internal insertion processing mode if the input RGB value of the calculation target point is present inside the printer color gamut of the color image signal handled by the CMYK signal processing system, or a step of executing the external insertion processing mode if the input RGB value of the calculation target point is present outside the printer color gamut of the color image signal handled by the CMYK signal processing system.

Here, the internal insertion processing mode is the processing of obtaining the output CMYK value of the color image signal handled by the CMYK signal processing system corresponding to the input RGB values of the four peak points encircling the input RGB value of the calculation target point when the input RGB value is expressed by expanding the color image signals R, G, and B of the RGB signal processing system.

In addition, the external insertion processing mode is the processing of obtaining the output CMYK value of the color image signal handled by the CMYK signal processing system corresponding to the input RGB values of three peak points encircling the calculation target point and the RGB value of the calculation reference point, after extracting the calculation reference point from the color image signals of the RGB signal processing system expressed in the isochromatic three dimensional coordinate system, and also, fixing that calculation reference point, and connecting that calculation reference point with the calculation target point by a straight line. This external insertion processing mode includes the processing of obtaining the CMYK values less than 0 gradations and more than $2^N$ gradations outside the printer color gamut that cannot be handled by the CMYK signal processing system.

According to the RGB→CMYK3D-LUT described above, in the case of carrying out color conversion of the color image signals of the RGB signal processing system into the color image signals C, M, Y, and K of the CMYK signal processing system 30, the color image signals R, G and B of the RGB signal processing system 20 outside the printer color gamut and that cannot be handled by the CMYK signal processing system 30 can be color converted and interpolated with good reproducibility as CMYK values of the upper limit or the lower limit of the printer color gamut handled by that CMYK signal processing system 30.

In this manner, according to the image processing apparatus 100 as a preferred embodiment, a ROM 40 is provided according to the present preferred embodiment in which the calculation target points are corrected for each of the six fundamental colors, the color image signals R, G, and B of the three color RGB input system is color converted into the color image signals C, M, Y, and K of the four color CMYK output system.

Therefore, it is possible to carry out color conversion of the color image signals R, G, and B of the three color RGB input system into the color image signals C, M, Y, and K of the four color CMYK output system without color mixing. Because of this, it is possible to provide an image processing apparatus 100 that can reproduce high quality color images.

Figure 2:
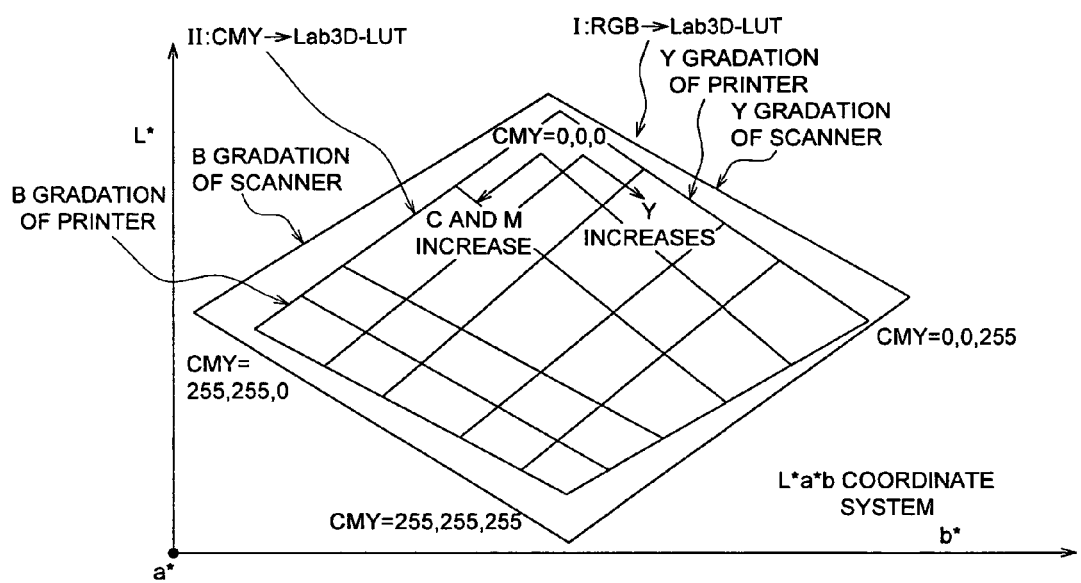
FIG. 2 is a color coordinates diagram showing an example of development of the CMY→Lab3D-LUT and the RGB→Lab3D-LUT in the Lab coordinates system constituting RGB→CMYK3D-LUT.

Next, further detailed explanation is given about the RGB→CMYK3D-LUT in which the calculation target point is corrected for each of the six fundamental colors. FIG. 2 is a color coordinates diagram showing an example of development of the CMY→Lab3D-LUT and the RGB→Lab3D-LUT in the Lab coordinates system constituting RGB→CMYK3D-LUT.

The vertical axis shown in FIG. 2 is the lightness L* axis, and the horizontal axis is the chromaticity b* axis. The point at the intersection of the lightness L* axis and the chromaticity b* axis is the chromaticity a* axis. In FIG. 2, the first lattice shape I is the RGB→Lab3D-LUT which is the 8-bit color image signals R, G, and B of the RGB signal processing system expressed in 256 gradations. The outline of the lattice shape I indicates the boundary of the color gamut that is handled by the RGB signal processing system.

In this example, the lattice shape II developed so as to be included inside the lattice shape I indicates the CMY→Lab3D-LUT which is the 8-bit color image signals C, M, Y, and K handled by the CMYK signal processing system and expressed in 256 gradations. The outline of the lattice shape II indicates the boundary of the color gamut (hereinafter referred to as the printer color gamut) that is handled by the CMYK signal processing system. The top corner part corresponds to a CMY value of [0, 0, 0], the left corner part to a CMY value of [255, 255, 0], the bottom corner part to a CMY value of [255, 255, 255], and the right corner part to a CMY value of [0, 0, 255].

In the RGB→Lab3D-LUT of the lattice shape I, the downward right slanting inclined line (side) denotes the Y gradations (0 to 255) of the scanner and the downward left slanting inclined line (side) denotes the B gradations (0 to 255) of the scanner. In the CMY→Lab3D-LUT of the lattice shape II, the downward right slanting inclined line (side) of the denotes the Y gradations (0 to 255) of the printer and the downward left slanting inclined line (side) denotes the B gradations (0 to 255) of the printer. In both the RGB→Lab3D-LUT and the CMY→Lab3D-LUT, the Y color increases downwards to the right and the B color increases downwards to the left.

In this example, the inside or outside judgment of whether to execute the internal insertion processing mode or to execute the external insertion processing mode described above is carried out by setting that reference in the printer color gamut (the color gamut handled by the CMYK signal processing system). Here, the interior of the printer color gamut is defined as inside the printer color gamut and its exterior is defined as outside the printer color gamut.

Figure 3:
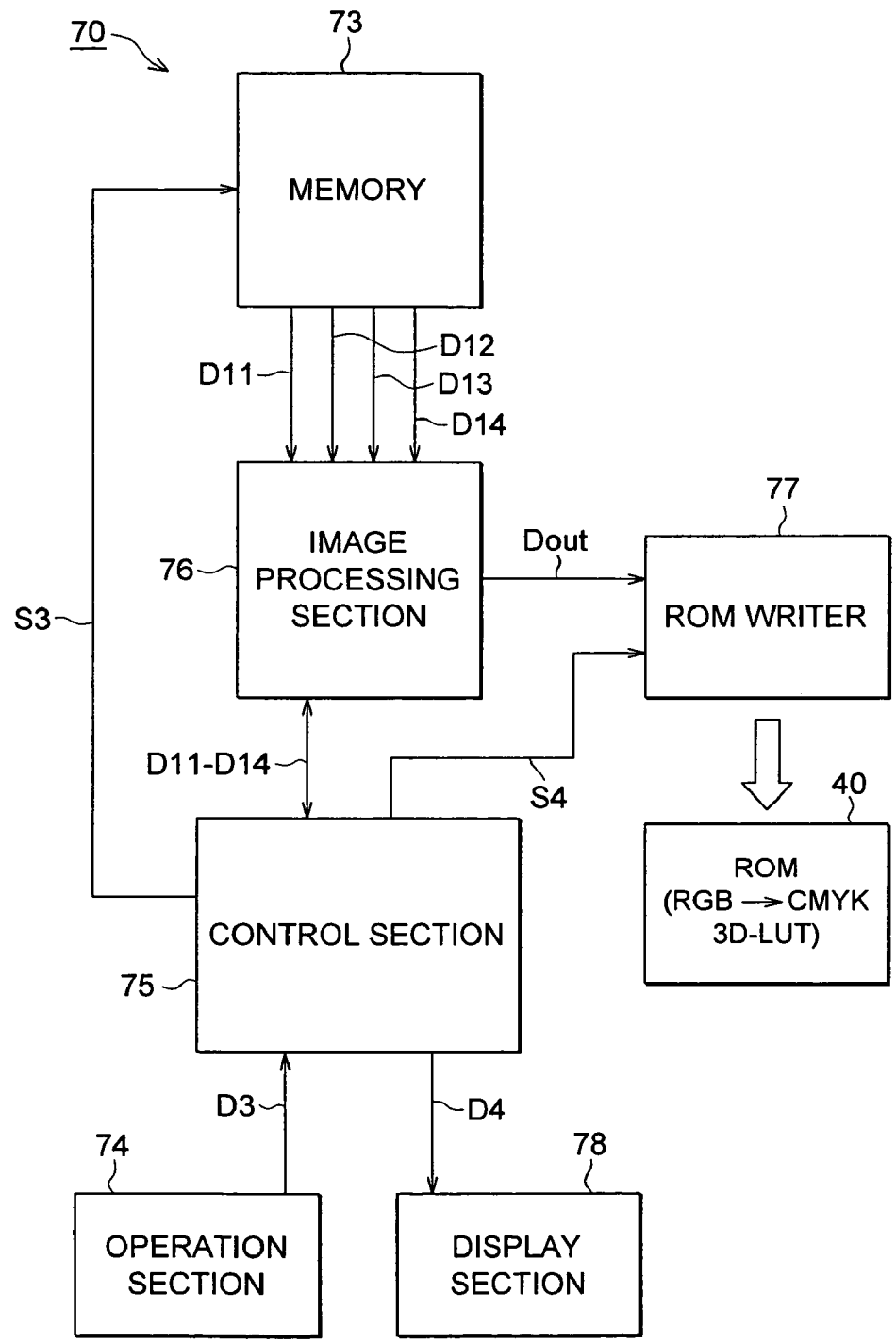
FIG. 3 is a block diagram showing a sample configuration of the information generation apparatus 70.

Next, the method of generating the color conversion table in the present preferred embodiment is described here. In this example, the presumption is the case when the 8-bit color image signals R, G, and B of the RGB signal processing system are converted into the 8-bit color image signals C, M, Y, and K of the CMYK signal processing system. FIG. 3 is a block diagram showing a sample configuration of the information generation apparatus 70. In the present preferred embodiment, although the information generation apparatus 70 has been configured as a separate entity from the information processing apparatus 100, it can also be configured to be an integral part of the information processing apparatus 100. The information generation apparatus 70 shown in FIG. 3 generates the RGB→CMYK3D-LUT by correcting the calculation target point for each of the six fundamental colors based on RGB→Lab3D-LUT and CMYK→Lab4D-LUT. The RGB→CMYK3D-LUT is a color conversion table for converting the color image signals R, G and B of the three color RGB input system into the color image signals C, M, Y, and K of the four color CMYK output system. The information generation apparatus 70 is configured to have a memory 73, an operation section 74, a control section 75, an image processing section 76, a ROM writer 77, and a display section 78.

To begin with, as a preliminary preparation for the generation of the color conversion table, in a system of FIG. 1 configured to have an RGB signal processing system 20, an image processing apparatus 100, and a CMYK signal processing system 30, a color patch image by converting a plurality of representative colors defined in the Lab space into colors expressed by C, M, Y, K using the CMYK→Lab4D-LUT is printed by the printer, this printed color patch image is read out by the scanner in FIG. 1, and the input data (to be described later) is obtained which is the data indicating the plurality of colors defined in the Lab space by converting each patch color using the RGB→Lab3D-LUT. This input data is stored in the memory 73 of FIG. 3.

The input data D11 described above used for generating the RGB→Lab3D-LUT or the CMYK→Lab4D-LUT, the Lab data D12, the CMY data D13, the LCH data D14, etc., are stored in the memory 73. The Lab values such as the lightness L*, the chromaticity a* and b*, etc., are included in the Lab data D12. The lightness L* and the chromaticity a* and b* are expressed by the lightness-chromaticity coordinate space (hereinafter referred to as the Lab color coordinates). The LCH values such as the lightness L*, the chroma C*, the hue H*, etc., are included in the LCH data D14. The lightness L*, the chroma C*, and the hue H* are expressed by the lightness-hue pole coordinate system (hereinafter referred to as the LCH color coordinate system).

The input data D11, Lab data D12, CMY data D13, LCH data D14, etc., are read out from the memory 73 into the RAM, etc., inside the image processing section 76 based on the memory control signal S3. The memory control signal S3 is outputted from the control section 75 to the memory 73. A hard disk drive or DRAMs are used for the memory 73. In this example, the 8-bit input RGB values, is divided, taking the example of 256 gradations, into 33 stages of 8 gradations each, and the values 0 to 32 are set for the respective segments. The RGB value of the calculation target point of this input data D11 is denoted by pin, and the output Lab value of the Lab data D12 is denoted by qout.

The image processing section 76 is connected to the memory 73, and the control section 75 is connected to the image processing section 76. The image processing section 76 is configured to include, for example, a DSP (Digital Signal Processor) and a RAM, etc., and the control section 75 is configured to have a CPU, a ROM, and a RAM.

The operation section 74 and the display section 78 are connected to the control section 75, and operation is made from the operation section 74, for example, to select the gradation number equivalent to each of the axes of RGB of the color three-dimensional coordinate system obtained from within the RGB→Lab3D-LUT. This selection operation is for setting the input RGB value of the calculation reference point pc. The data set in the operation section 74 becomes the operation data D3 and is outputted to the control section 75. The three-dimensional color coordinate system, etc., is displayed in the display section 78 based on the display data D4. The display data D4 used is that stored as the graphic display tool in the memory section provided in the control section 75 or in the image processing section 76.

The control section 75 corrects the calculation target point after moving the positions of the maximum gradations of the six fundamental colors (each of the colors R, Y, G, C, B, M) of the four color CMYK output system to the position of the maximum gradations of the six fundamental colors (each of the colors R, Y, G, C, B, M) of the three color RGB input system, and also, corrects by moving the positions other than that of the maximum gradation of output system fundamental colors to the positions other than that of the maximum gradation of input system fundamental colors and corrects the calculation target point at each gradation of those output system fundamental colors.

The control section 75 carries out, for example, in the LCH color coordinate system, computes the first moving distance by obtaining the difference between the position of the maximum gradation of the output system fundamental colors and the position of the maximum gradation of the input system fundamental colors, and also, computes the second moving distance by obtaining the difference between the position, outside the maximum gradation of the output system fundamental colors and the position of the maximum gradation outside the input system fundamental colors for each gradation of that fundamental color. For example, the control system 75 is handled to carry out the computation so that the output system color image signals CMYK after converting the fundamental color gradations of the input system color image signals RGB is identical to that fundamental color gradation of the color gamut of that color image signal of the output system, and it is possible to make that calculation target point (coordinates value) become identical for each fundamental color gradation of the output system color image signals CMYK or of the input system color image signals RGB.

Apart from this, at the time of computing the Lab CMYK value of the Lab color coordinate system corresponding to the input RGB value of the calculation target point pin based on the operation data D3 outputted from the operation section 74, the control section 75 outputs the input RGB value to the image processing section 76. For example, the control section 75 sets the center RGB value in the image processing section 76. In this example, we consider the case when the center RGB value that becomes the calculation reference point pc is set at the stage R=G=B=17 out of the 33 stages of lattice points. The setting of the center RGB value need not be set at the 17$^{th}$ stage but can also be set at any other stage. The input RGB value of this calculation reference point is taken as pc and its Lab value is taken as qc.

The image processing section 76 described above carries out the color gamut surface search processing under the operation from the operation section 74 and the control of the control section 75. In addition, the image processing section 76 inputs the input data D11, and executes the triangle setting processing, the triangular pyramid setting processing, the inclusion judgment processing, and the inside or outside color gamut judgment processing to be described later.

The RGB→CMYK3D-LUT generation control is carried out based on the detection result of the inside or outside color gamut judgment processing obtained from the image processing section 76. At this time, the control section 75 executes the internal insertion processing mode when the input RGB value of the calculation target point pin detected by the image processing section 76 is inside the printer color gamut, and executes the external insertion processing mode when the input RGB value of the calculation target point pin detected by the image processing section 76 is outside the printer color gamut. In the external insertion processing mode, the control section 75 carries out external insertion interpolation by calculating the Lab CMYK value in the Lab color coordinates system corresponding to the input RGB value of the calculation target point pin. Of course, it is not necessary to restrict to external insertion processing but also compression processing can be made.

The ROM writer 77 is connected to the control section 75 and to the image processing section 76, and operates to write the RGB→CMYK3D-LUT in the ROM based on the ROM write signal S4 and the ROM data Dout. The ROM data Dout is the data for configuring the RGB→CMYK3D-LUT. This RGB→CMYK3D-LUT written in the ROM has been improved compared to the conventional examples. The ROM writing signal S4 is outputted from the control section 75 to the ROM writer 77. A judgment is made as to whether or not this Lab value is inside the color gamut or outside the color gamut of the corresponding CMY→Lab3D-LUT (inside or outside color range judgment processing).

In this example, when the calculation target point pin is judged to be outside the printer color gamut by the inside or outside color range judgment processing, the image processing section 76 is controlled by the control section 75 and executes the compression processing.

Figure 4:
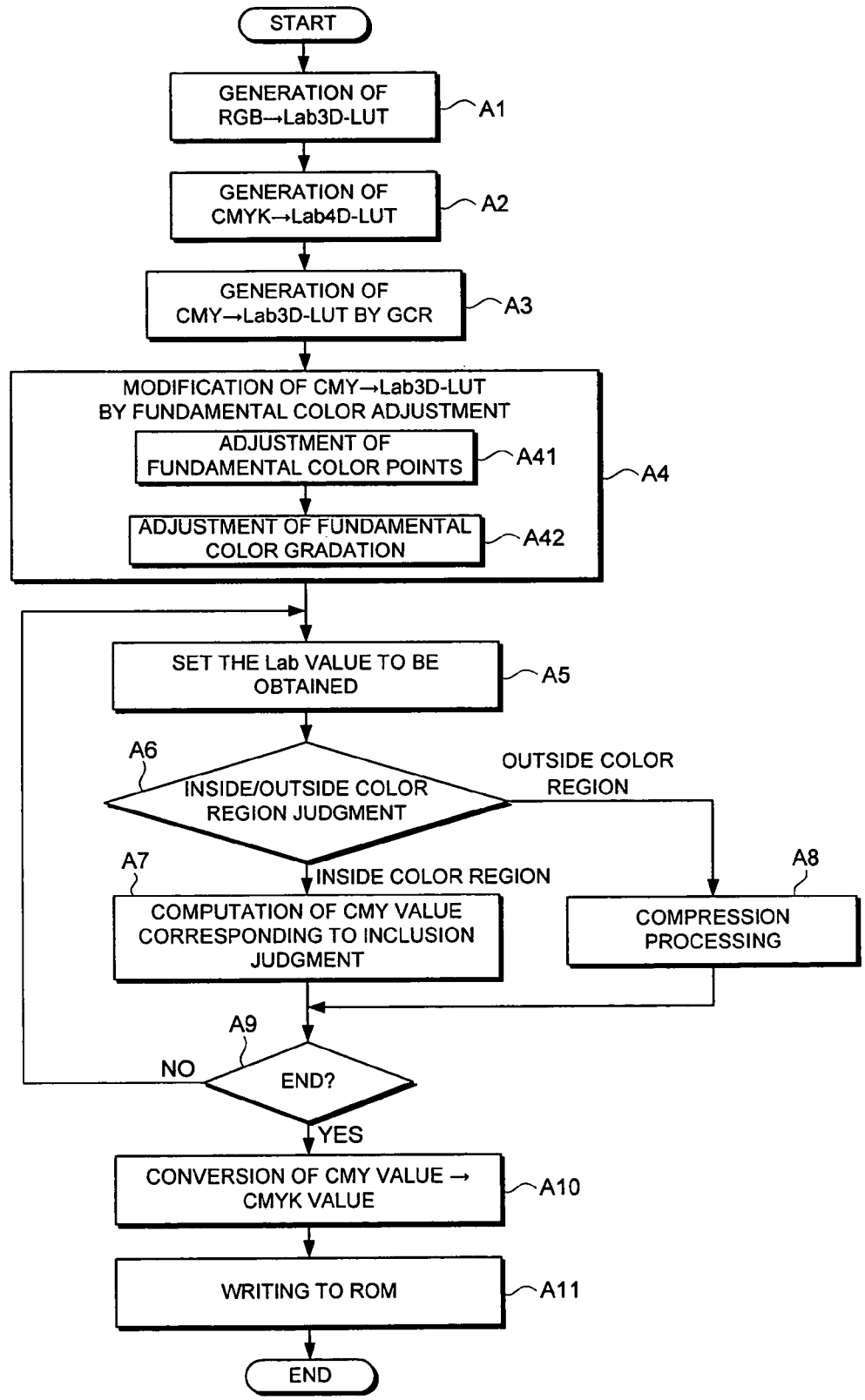
FIG. 4 is a flow chart (main routine) showing an example of generating the RGB→CMYK3D-LUT with the calculation target points compensated for each of the six fundamental colors and that is executed in the information generation apparatus 70.
Figure 5:
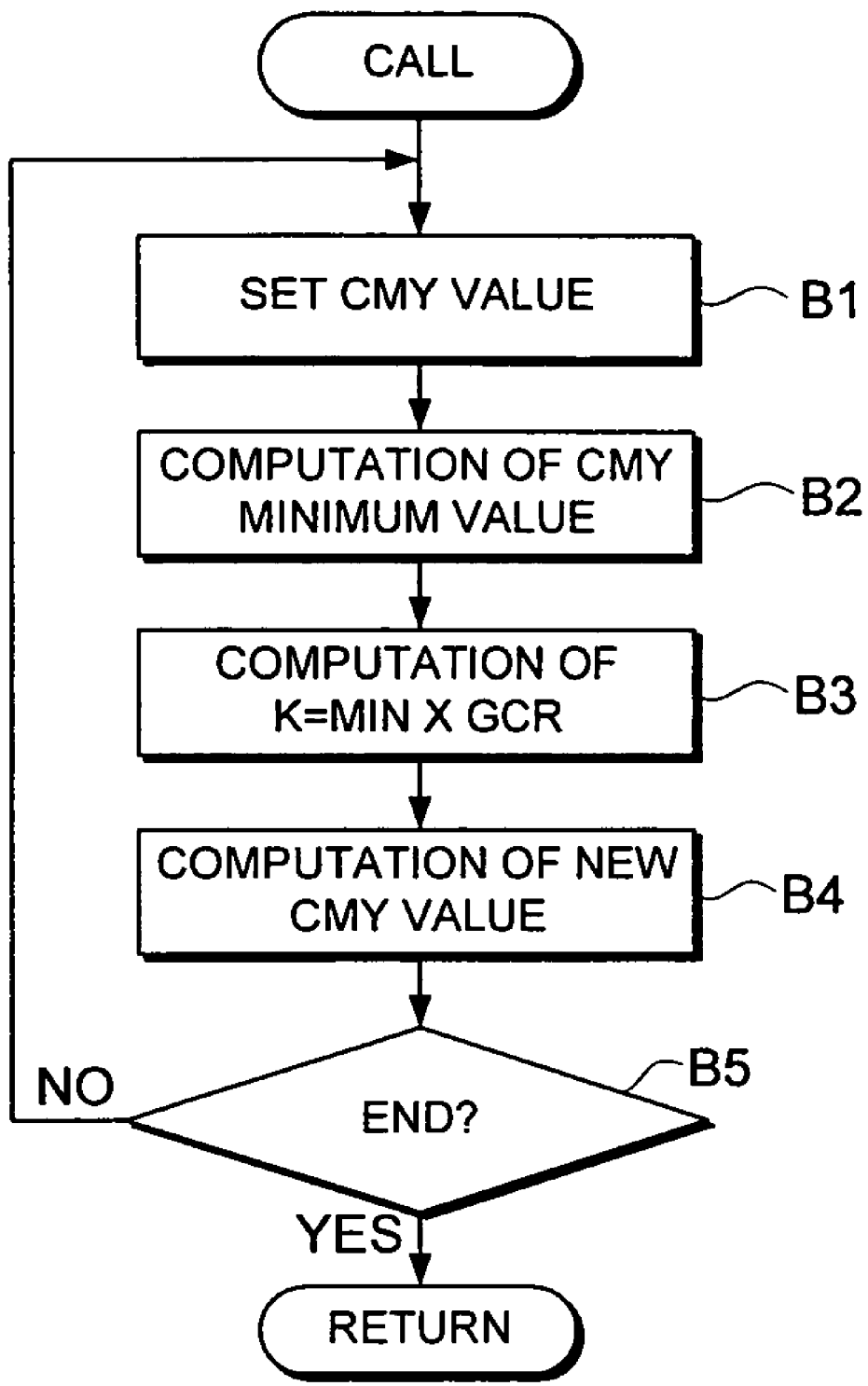
FIG. 5 is a flow chart showing an example of generating the CMY→CMYK3D-LUT using a GCR algorithm.
Figure 6:
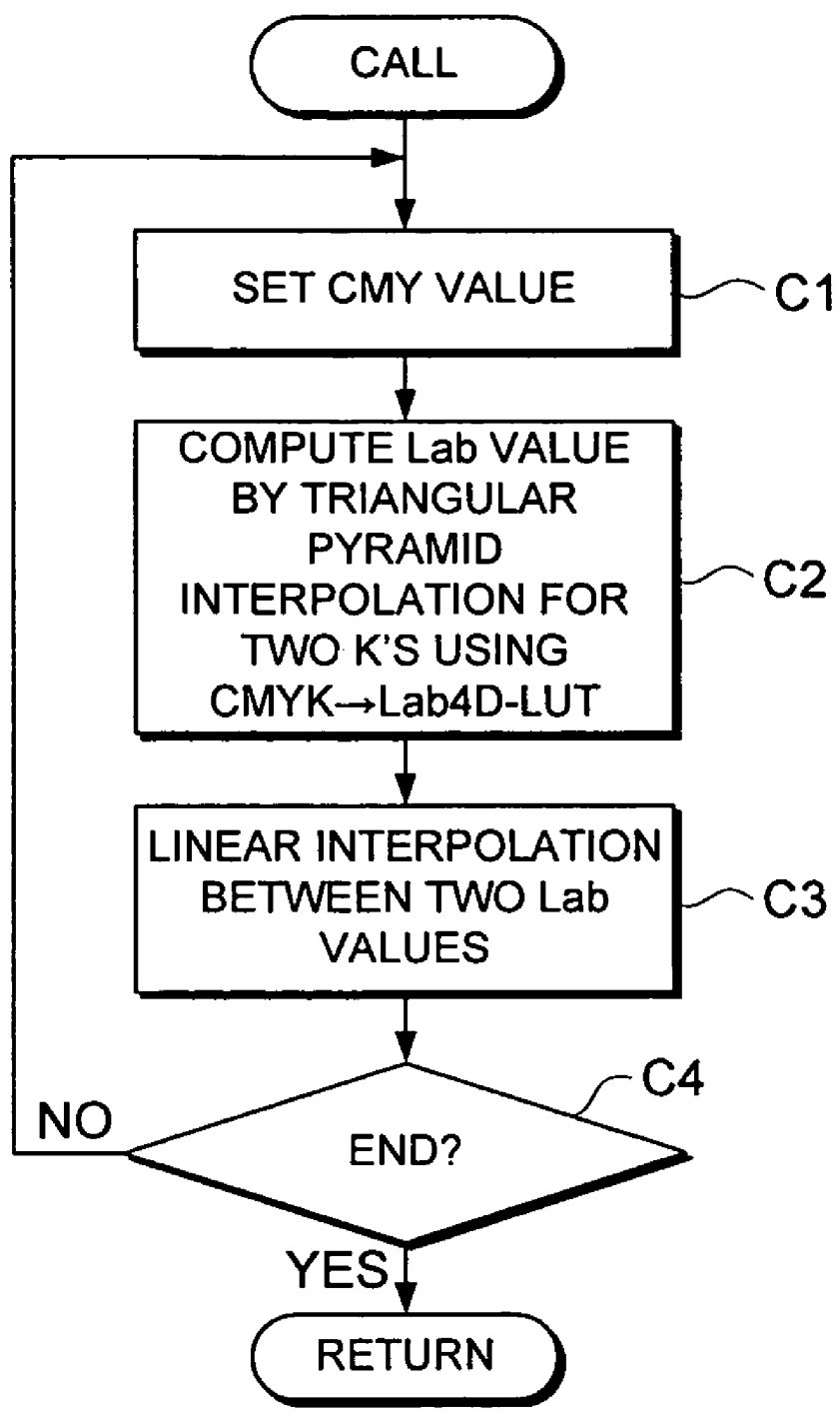
FIG. 6 is a flow chart (subroutine) showing an example of generating the CMY→Lab3D-LUT.

FIG. 4 is a flow chart (main routine), which is executed in the information generation apparatus 70, showing an example of generating the RGB→CMYK3D-LUT with the calculation target points compensated for each of the six fundamental colors. FIG. 5 is a flow chart (subroutine) showing an example of generating the CMY→CMYK3D-LUT using a GCR algorithm, and FIG. 6 is a flow chart (subroutine) showing an example of generating the CMY→Lab3D-LUT.

In this preferred embodiment, the assumption is the case of generating the color conversion table for color conversion of the color image signals R, G, and B of the three color RGB input system into the color image signals C, M, Y, and K of the four color CMYK output system. At this time, not only the calculation target point of fundamental color points but also the calculation target points of fundamental color gradations are moved. In this example, the case is considered that the input data D11 and the Lab data D12 for generating the RGB→Lab3D-LUT and also the CMY data D13 for generating the CMYK→Lab4D-LUT are stored beforehand in the memory 73.

In this example, the case is considered of carrying out correction of the calculation target point by moving the positions of the maximum gradations of the six fundamental colors (each of the colors R, Y, G, C, B, M) of the four color CMYK output system to the position of the maximum gradations of the six fundamental colors (each of the colors R, Y, G, C, B, M) of the three color RGB input system, and thereafter, corrects by moving the positions other than that of the maximum gradation of output system fundamental colors to the positions other than that of the maximum gradation of input system fundamental colors and corrects the calculation target point at each gradation of that output system fundamental colors.

Further, as a result of carrying out the inside or outside color gamut judgment, the operation moves to the internal insertion processing mode only when the calculation target point is judged to be inside the printer color gamut, and moves to the external insertion processing mode if it is judged to be outside the printer color gamut.

Taking these as the condition for preparation of tables, under the instruction of the control section 75 in Step A1 of the flow chart shown in FIG. 4, the input data D11 and the Lab data D12 are read from the memory 73 into the image processing section 76 and are expanded in the RAM, etc. In the RAM, the input data D11 and the Lab data D12 are expanded and the RGB→Lab3D-LUT is generated. The RGB→Lab3D-LUT is generated using, for example, the image processing method disclosed in Japanese Patent Public Disclosure No. 3174604. Some other methods can be used for generating this table, and it is sufficient if the RGB→Lab3D-LUT is prepared. In this example, the number of lattice points is 18×18×18 (=5832).

Next, under instruction from the control section 75 in Step A2, the CMY data D13 is read from the memory 73 into the image processing section 76 and is expanded in the RAM. The CMY data D13 is expanded in the RAM and the CMYK→Lab4D-LUT is generated. The CMYK→Lab4D-LUT is generated using, for example, the image processing method disclosed in Japanese Patent Application Laid Open to Public Inspection No. H06-242523. Some other methods can be used for generating this table, and it is sufficient if the CMYK→Lab4D-LUT is prepared. In this example, the number of lattice points is 17×17×17×17 (=83521).

Next, the operation moves on to Step A3, and the image processing section 76 generates the CMY→Lab3D-LUT from the CMYK→Lab4D-LUT based on a GCR algorithm. At this time, as the number of lattice points of the CMY→Lab3D-LUT, for example, set about 33×33×33 (=35,937) points. In order to generate a CMY→Lab3D-LUT with such a number of lattice points, the execution is carried out by dividing the process into the two stages of the processing of generating the CMY→CMYK3D-LUT using a GCR algorithm, and the processing of generating the CMY→Lab3D-LUT by triangular pyramid interpolation using the CMYK→Lab4D-LUT.

Processing of Preparation of CMY→CMYK3D-LUT:

This processing is executed by the image processing section 76. For example, using a GCR algorithm, in order to generate the CMY→CMYK3D-LUT, the subroutine shown in FIG. 5 is called and the CMY value is set in its Step B1. At this time, the C, M, and Y values respectively are stepped up from 0 to 32, and the operation of computing the CMYK value at the respective CMY values is repeated successively.

Further, the operation moves on to Step B2 and the minimum value is outputted from the CMY values set earlier. For example, if the computed values are C=10, M=12, and Y=7, the minimum value (min) is min=7. Thereafter, the operation moves on to Step B3 and the black color value K is computed. In this example, the black color value K is obtained by multiplying the above mentioned value min by GCR (UCR: Under Color Removal), that is, it is obtained using Equation (1) below.

$$K = min \times GCR(UCR) \qquad (1)$$

(Generation of K)

This GCR indicates the extent of generating the black color value K, and a value in the range 0.0 to 1.0 is selected for this parameter. For example, when GCR is 0.9, K=7×0.9=6.3. In this example, if the value of K is large, the amount of black color used becomes larger, and if the value of K is small, the amount of black color used becomes smaller.

Next, in Step B4, the new CMY value is computed. In this example, the new C, M, and Y values are computed by deducting the above value K from the original C, M, and Y values. For example, if the new C, M, and Y values are denoted respectively as newC, newM, and newY, they can be obtained by the following Equation (2).

$$newC = C - K \rightarrow newC = 10 - 6.3 = 3.7$$

$$newM = M - K \rightarrow newM = 12 - 6.3 = 5.7$$

$$newY = Y - K \rightarrow newY = 7 - 6.3 = 0.7 \qquad (2)$$

In this manner, the CMYK value corresponding to a particular CMY value is computed. Thereafter, the operation moves on to Step B5, and a judgment is made as to whether or not the CMYK values have been computed for the entire CMY data D13 (end judgment). If the computation of the CMYK values for the entire CMY data D13 has not been completed, the operation returns to Step B1 and the steps are repeated. When the CMYK values have been computed for all the CMY data D13, the CMY→CMYK3D-LUT is generated.

Processing of Preparation of CMY→Lab3D-LUT:

This processing is executed by the image processing section 76. This CMY→Lab3D-LUT is generated by triangular pyramid interpolation using the CMYK→Lab4D-LUT. For example, each of the CMYK values of the CMY→CMYK3D-LUT generated in the Steps B1 to B5 of the subroutine described above is converted into a Lab value using CMYK→Lab4D-LUT, and the CMY→Lab3D-LUT is generated by repeating this conversion processing.

For example, using the GCR algorithm, in order to prepare the CMY→Lab3D-LUT, the subroutine shown in FIG. 6 is called and the CMY value is set in its Step C1. In this example, regarding the CMY→CMYK3D-LUT generated earlier, when the CMYK values are C=135, M=232, Y=96, and K=8, referring to K=8, from the CMYK→Lab4D-LUT, the CMYK (K=first)→Lab3D-LUT and CMYK (K=second)→Lab3D-LUT are used.

Further, in Step C2, the Lab value is computed by carrying out triangular pyramid interpolation with two K values using the CMYK→Lab4D-LUT. For example, the Lab value corresponding to the address C=135, M=232, and Y=96 in the CMYK (K=first)→Lab3D-LUT is computed by triangular pyramid interpolation processing. As a result of this triangular pyramid interpolation processing, the Lab value of K=first (hereinafter referred to as Lab1) will be Lab1=[L, a, b]=[35, 37, −4].

Further, the Lab value corresponding to the address C=135, M=232, and Y=96 in the CMYK (K=second)→Lab3D-LUT is computed by triangular pyramid interpolation processing. As a result of this triangular pyramid interpolation processing, the Lab value of K=second (hereinafter referred to as Lab2) will be Lab2=[L, a, b]=[34, 36, −4].

Thereafter, in Step C3, linear interpolation is made for the two values Lab1 and Lab2 obtained earlier based on the black color value K. Here, if we denote the new Lab value in the case when K=8 by newLab, it can be expressed by the following Equation (3).

$$newLab=((16-K(=8))/16) \times Lab1+((16-K(=8))/16) \times Lab2 \quad (3)$$

When newLab is computed by substituting the values of Lab1 and Lab2 in Equation (3), it will be newLab=[L, a, b]=[34, 37, −4]. The value newLab obtained in this manner becomes the Lab value corresponding to the CMYK value for the K value.

After that, the operation moves on to Step C4, and a judgment is made as to whether or not the Lab values have been computed for the CMYK values at the K value of the entire CMY data D13 (end judgment). If the computation of the Lab values for the CMYK values at the K value of the entire CMY data D13 has not been completed, the operation returns to Step C1 and the above processing is repeated. When the Lab values for the CMYK values at the K value of all the CMY data D13 have been computed and the processing has been repeated for all the lattice points, it is possible to generate the CMY→Lab3D-LUT. When the CMY→CMYK3D-LUT and the CMY→Lab3D-LUT have been generated using the above two subroutines, the processing returns to Step A3 of the main routine.

After that, the operation moves on to Step A4, and the processing of modifying the CMY→Lab3D-LUT by fundamental color adjustment is carried out. For example, in Step A41, to begin with, the adjustment processing of fundamental color points is executed. After that, in Step A42, the adjustment processing of fundamental color gradations is executed.

Figure 7:
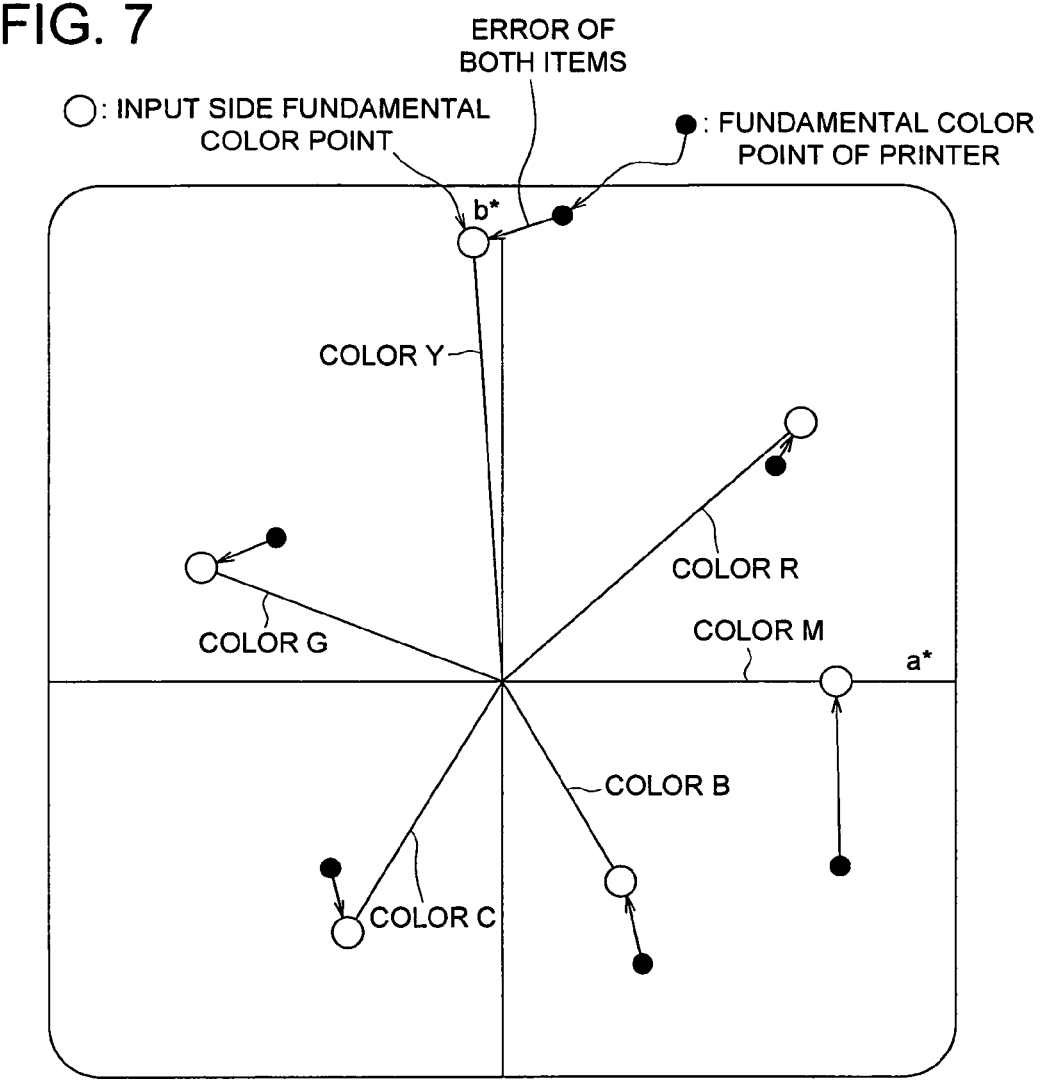
FIG. 7 is a diagram showing an example of the relationship between the input side fundamental color point of the CMYRGB colors in the Lab coordinate system and the printer side fundamental color points (Max).

Adjustment Processing of Fundamental Color Points:

FIG. 7 is a diagram showing an example of the relationship between the input side fundamental color points of the CMYRGB colors in the Lab coordinate system and the printer side fundamental color points (Max). In this example, the first moving distance is computed by obtaining the differences between the positions of the maximum gradation of the output side (printer) fundamental colors and the positions of the maximum gradation of the input side fundamental colors. The horizontal axis in FIG. 7 is the color saturation a* of the color Y or of the color B, and the vertical axis is the color saturation b* of the color G or of the color M. The filled circles in the figure indicate the fundamental color gradation (Max) on the printer side, and the open circles indicate the fundamental color gradation (Max) on the input side. In this figure, the difference between the filled circles of the printer side fundamental color gradation (Max) and the open circles of the input side fundamental color gradation (Max) is the error (DIFF). The method used in the present preferred embodiment is that, regarding the colors CMYRGB, the calculation target points of the fundamental color points are moved from the output side to the input side, and also, in other cases the calculation target points are moved from the output side to the input side for each fundamental color gradation.

Figure 8:
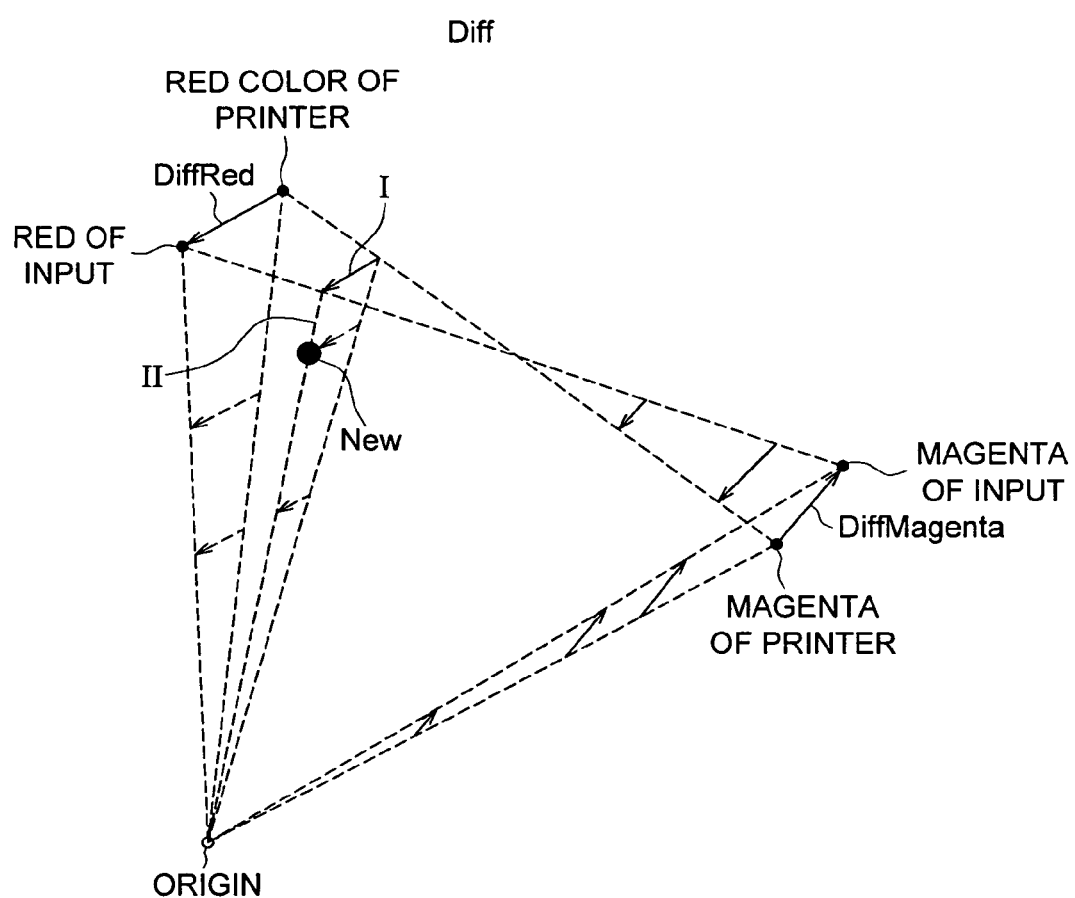
FIG. 8 is a diagram showing an example of adjustment of the fundamental color points in the Lab coordinate system.

FIG. 8 is a conceptual diagram showing an example of adjustment of the fundamental color points in the Lab coordinate system. When the position of the new calculation target point shown in FIG. 8 is taken as New, it is obtained by two processings #I and #II. In processing #I, from the relationship between the color R of the printer and the color R of the input, the error between these input value and output value is obtained (the vector DiffRed), and also, from the relationship between the color M of the printer and the color M of the input, the error between these input value and output value is obtained (the vector DiffMagenta). Linear interpolation is carried out for these two vectors using Hue.

Next, in processing #II, the Diff amount of the position New of the new calculation target point is obtained based on the chroma C* and the maximum chroma MaxC* of its Hue. For example, Diff·(C*/MaxC*) is computed. The respective NewL*, NewC*, and NewH* are calculated. By eliminating the difference (Diff) between the two, it is possible to match the positions of the Max gradations of the six fundamental colors of the input side and of the output side.

If the lightness L*, chroma C*, and hue H* of the position New of the new calculation target point are obtained in this manner, it is possible to move the calculation target points of the fundamental color points from the output side to the input side. Further, as is shown in FIG. 8, the adjustment of the six fundamental color points in the Lab coordinate system is carried out, for the point having the input C* of MaxC*, by the same amount as that of the obtained DiffL*, C*, and H*. The amount of adjustment becomes smaller as the origin is approached by processing using C*/MaxC*.

Figure 9:
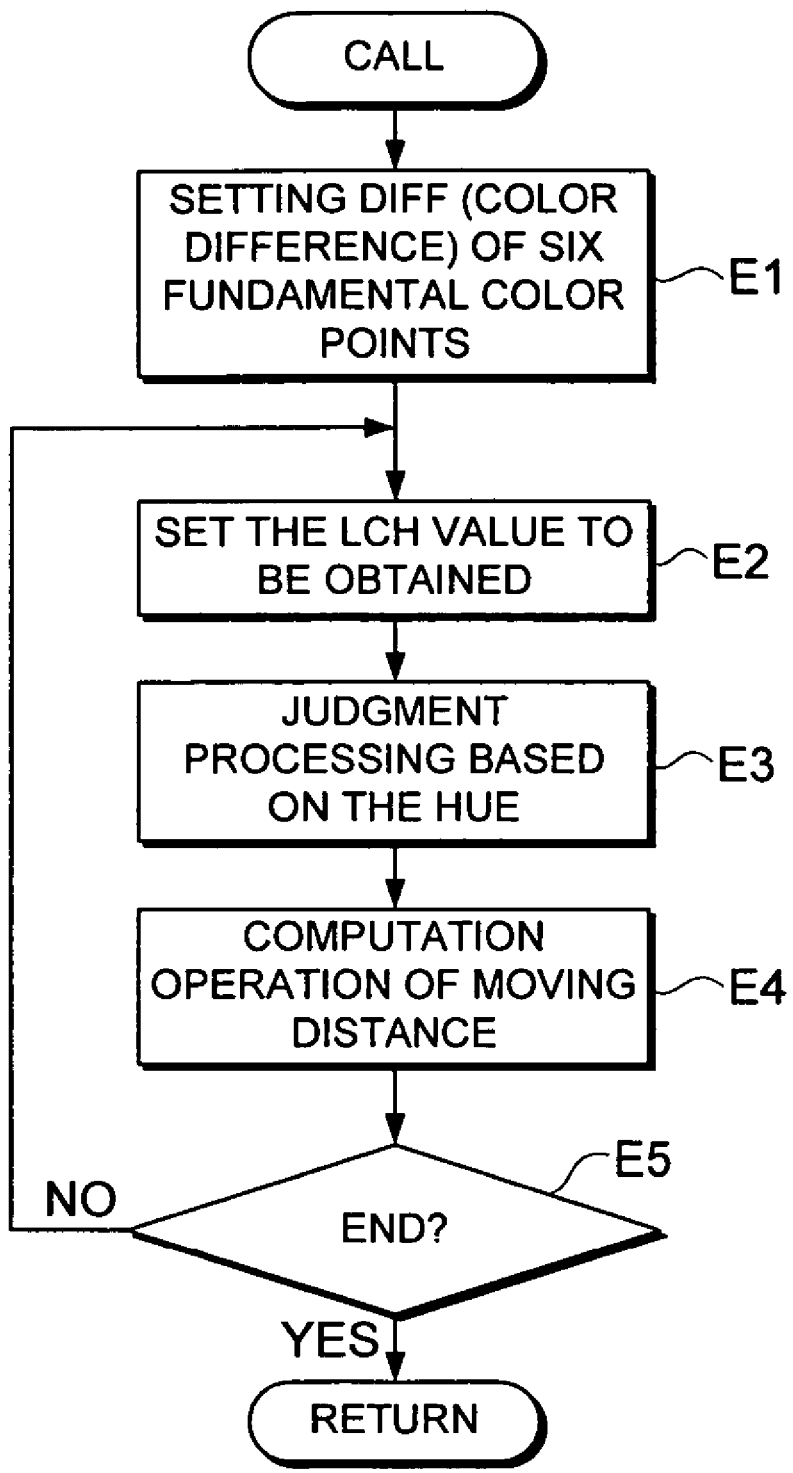
FIG. 9 is a flow chart showing an example of adjusting the positions of the six fundamental color points in the Lab coordinate system.
Figure 10:
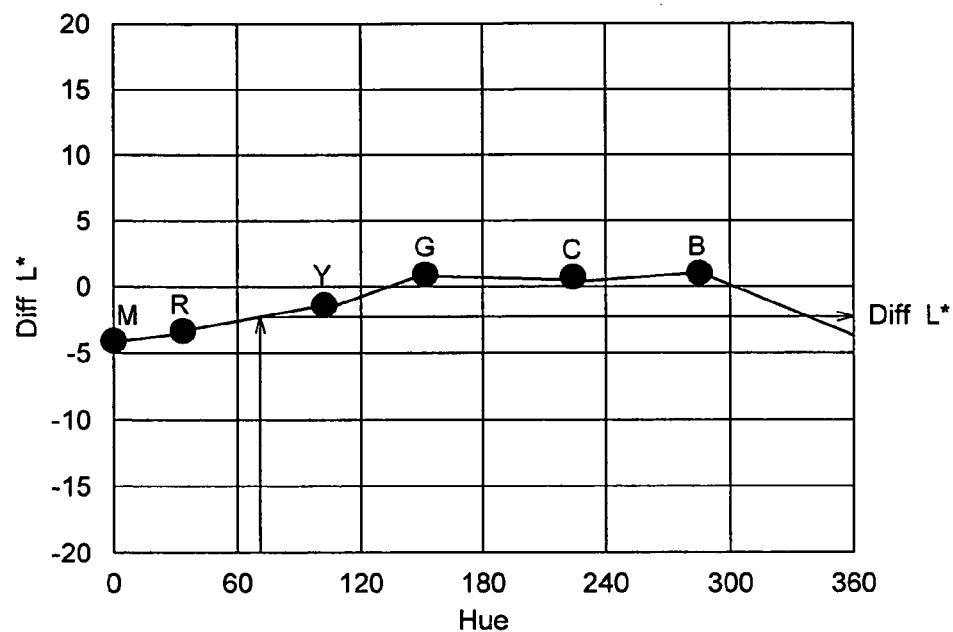
FIGS. 10(A), 10(B) are diagrams showing an example of the relationship between the error DiffL* in the lightness of the input values and the output values of the six fundamental colors, their chroma error DiffC*, and the color phase Hue.
Figure 10:
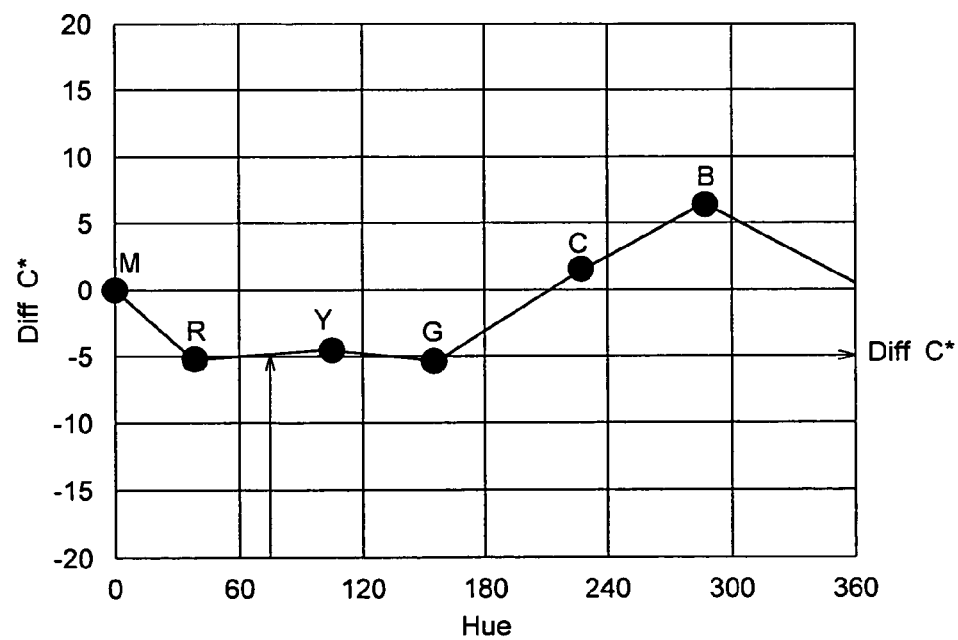
Figure 11:
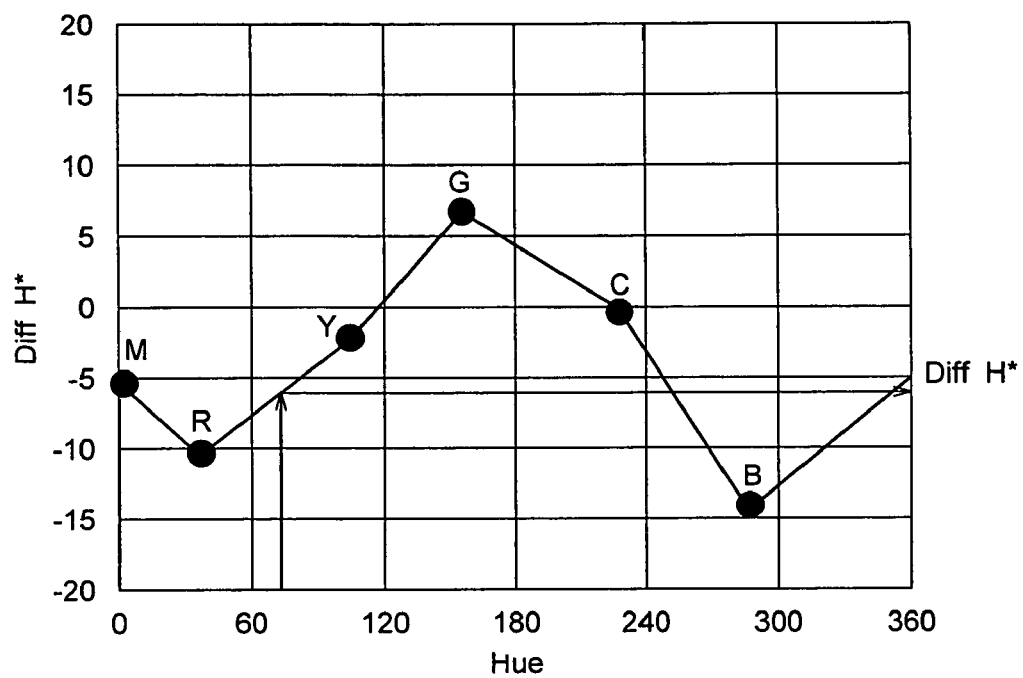
FIG. 11 is a diagram showing an example of the relationship between the error DiffH* in the hue of the input values and output values of the six fundamental colors and that color phase Hue.

FIG. 9 is a flow chart (subroutine) showing an example of adjusting the positions of the fundamental color points. FIG. 10(A), FIG. 10(B), and FIG. 11 are diagrams for supplementing this. FIG. 10(A) and FIG. 10(B) are diagrams showing an example of the relationship between the lightness error DiffL* and the hue Hue, and an example of the relationship between its chroma error DiffC* and hue Hue. FIG. 11 is a diagram showing an example of the relationship between the error in its hue DiffH* and its hue Hue.

In this example, the input color gamut generated in Step A3 shown in FIG. 4 above is taken as RGB→Lab3D-LUT, and output color gamut is taken as CMY→Lab3D-LUT. Before entering the flow chart shown in FIG. 9, the Lab values are converted to the LCH coordinate system using the formula (L*=L*, c*=(a*²+ b*²)^(1/2), H*=arc tan(b*/a*)).

After these conversions, in Step E1, the processing of setting the color difference (DIFF) of the six fundamental color points is carried out. At this time, the color difference (DIFF) in the LCH coordinate system of the fundamental color points between the input color gamut and the output color gamut is calculated. For example, taking the lightness of red color of the input color gamut as InputGamutRedL*, the lightness of red color of the output color gamut as OutputGamutRedL*, and the error in the lightness of red color as DiffRedL*, the relationship between them is given by Equation (4) below.

$$DiffRedL^{*}=InputGamutRedL^{*}-OutputGamutRedL^{*} \quad (4)$$

Further, taking the degree of saturation (chroma) of red color of the input color gamut as InputGamutRedC*, the degree of saturation (chroma) of red color of the output color gamut as OutputGamutRedC*, and error in the degree of color saturation of red color as DiffRedC*, the relationship between them is given by Equation (5) below.

$$DiffRedC^{*}=InputGamutRedC^{*}-OutputGamutRedC^{*} \quad (5)$$

Further, taking the color phase (hue) of red color of the input color gamut as InputGamutRedH*, the color phase (hue) of red color of the output color gamut as OutputGamutRedH*, and error in the color phase (hue) of red color as DiffRedH*, the relationship between them is given by Equation (6) below.

$$\text{DiffRed}H^* = \text{InputGamutRed}H^* - \text{OutputGamutRed}H^* \quad (6)$$

The amount of error (Diff) is obtained by computing these Equations (4) to (6). The other fundamental colors of Y, G, C, B, and M are obtained in a similar manner.

Graphs such as those shown in FIG. 10(A), FIG. 10(B), and FIG. 11 are obtained when the error in lightness DiffL* of each color of the six fundamental colors, namely the colors R, Y, G, C, B, M, the error in their chroma DiffC*, and the error in their color phase (hue) DiffH* are plotted along the vertical axis versus the hue (Hue, 0 to 360°) along the horizontal axis.

Next, in Step E2 the LCH value to calculate is set. For example, the LCH value (L*, C*, H*) of the output color gamut is set for one point at a time and this is taken as the input value. When calculation target points are present for $33^3$ lattice points, the loop process indicated below has to be repeated $33^3$ times.

Further, in Step E3, a judgment process based on the hue is executed. For example, in the drawings shown in FIG. 10(A), FIG. 10(B), and FIG. 11, a judgment is made as to between which of DiffL*, DiffC*, and DiffH* is the hue of the input value, and the amount of DIFF (DiffL*, C*, H*) at the input hue and the maximum chroma (MaxC*) at the input hue are obtained by linear interpolation. This is for making the maximum positions of the six fundamental colors identical.

For example, when the hue of the input value is 65°, the lightness error DiffL* for Hue=65° is read out from FIG. 10(A), the chroma error DiffC* for Hue=65° is read out from FIG. 10(B), and the chroma error DiffH* for Hue=65° is read out from FIG. 11. Next, in Step E4, the processing of computing the moving distance is executed. At this time, the LCH value at the new calculation target position is obtained from the input value and the Diff value. Here, if the new lightness L*, the new chroma C*, and the new hue H* are denoted by NewL*, NewC*, and NewH*, respectively, and if the DIFF amounts of lightness L*, chroma C*, and hue H* are denoted by Diff·(C*/MaxC*), Diff·(C*/MaxC*), and DiffH*, the values are computed by evaluating the following Equation (7).

$$\text{New}L^* = L^* + \text{Diff} \cdot (C^*/\text{Max}C^*)$$

$$\text{New}C^* = C^* + \text{Diff} \cdot (C^*/\text{Max}C^*)$$

$$\text{New}H^* = H^* + \text{Diff}H^* \quad (7)$$

Thereafter, an end judgment is carried out in Step E5. In this example, a judgment is made as to whether or not the computation (adjustment) of moving distance has been made for all the $33^3$ input values. If these computation operations have not been competed, the operation returns to Step E2 and the processing of setting the LCH value is repeated. Further, the color gamut of the $33^3$ points of LCH data D14 that have been subjected to computation processing is converted and returned to the Lab coordinate system using the formula [L*=L*, a*=cC*·cos(H*/180π), b*=sin(H*/180π)]. Because of this, it is possible to make identical the positions of maximum gradations of the six fundamental colors of the input side and output side.

Figure 12:
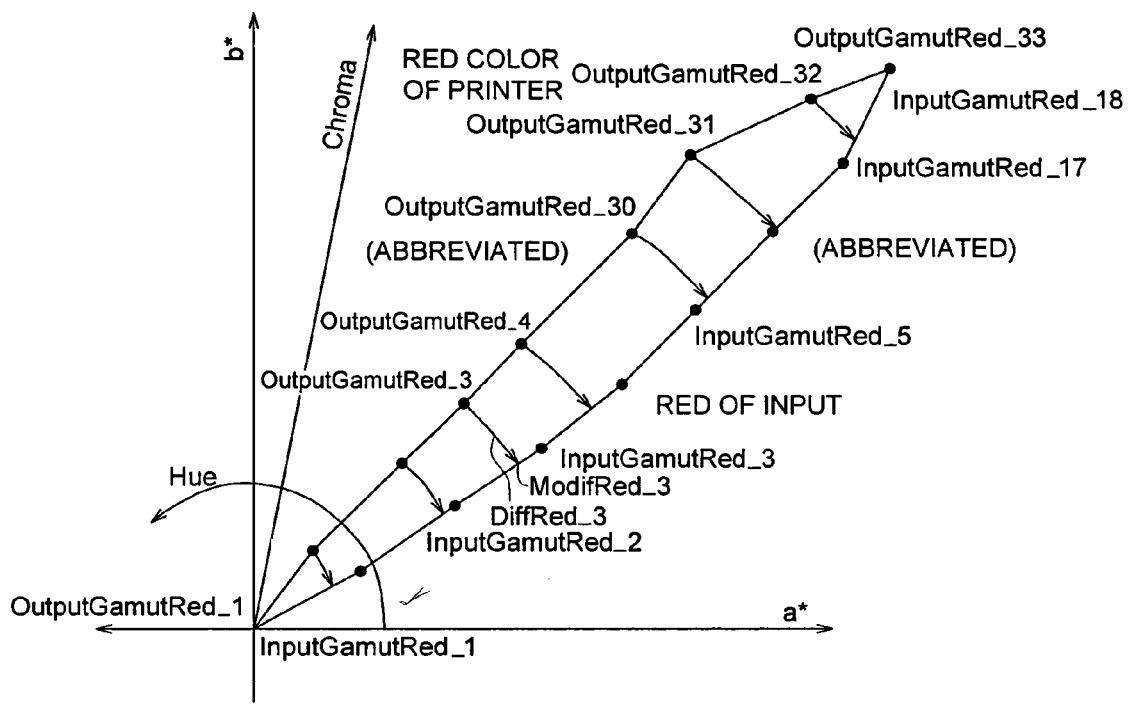
FIG. 12 is a conceptual diagram showing an example of adjusting the fundamental color gradation position in the Lab coordinate system.

Example of Adjustment of Fundamental Color Gradation Positions:

FIG. 12 is a conceptual diagram showing an example of adjusting the fundamental color gradation position in the Lab coordinate system. The horizontal axis in FIG. 12 indicates the color saturation a* of the color M, and the vertical axis indicates the color saturation b* of the color Y. This coordinate system indicates the input value and the output value of the color R, and is one in which the LCH coordinates (pole coordinates) expressing the Chroma vector and the Hue at the origin of the Lab coordinate system is superimposed.

In this coordinate system, at the origin of the Lab coordinates, the input value InputGamutRed1 of the first gradation of the color R on the input side matches with the output value OutputGamutRed1 of the first gradation of the color R on the output side, and also, at the position of the maximum gradation, the input value InputGamutRed18 of the eighteenth gradation of the color R on the input side matches with the output value OutputGamutRed33 of the maximum gradation of the color R on the output side.

In this example, the output color gamut of the output values OutputGamutRed2 to OutputGamutRed32 of the $2^{nd}$ to $32^{nd}$ gradations of the color R on the output side is moved to the input color gamut of the input values InputGamutRed2 to InputGamut17 of the $2^{nd}$ to $17^{th}$ gradations of the color R on the input side. The moving distance is obtained based on the chroma C* vector and the hue Hue in the LCH coordinate system.

In the figure, DiffRed3 is the error between the output value OutputGamutRed2 of the third gradation of the color R and the input value ModfRed3 of the third gradation of the color R of the calculation target point that is to be moved.

Figure 13:
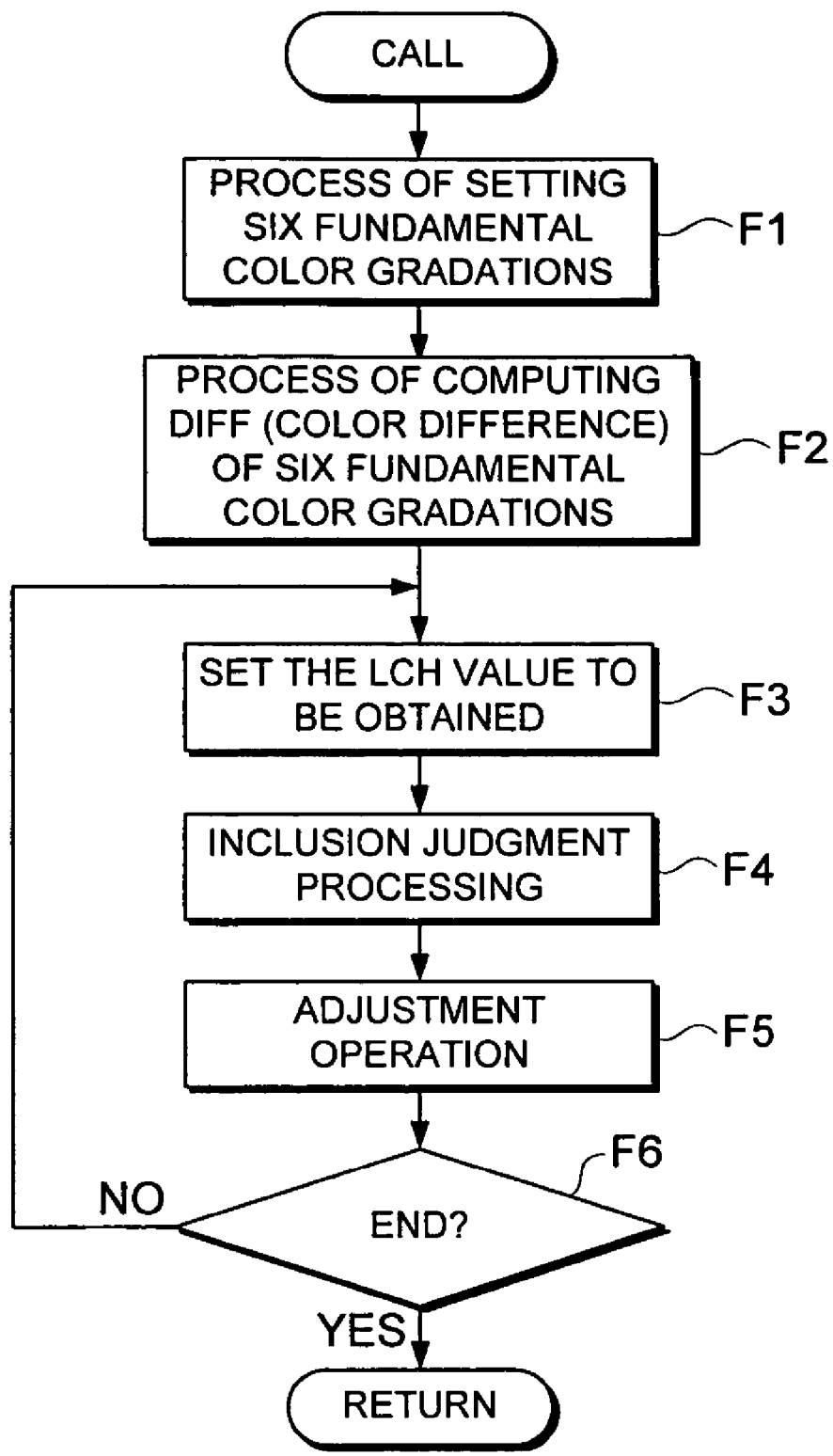
FIG. 13 is a flow chart (subroutine) showing an example of processing at the time of adjusting the fundamental color gradation position.

FIG. 13 is a flow chart (subroutine) showing an example of processing at the time of adjusting the fundamental color gradation position. In this example, the second moving distance is computed by obtaining the difference between the position other than that of the maximum gradation of the fundamental colors of the output system and the position other than that of the maximum gradation of the fundamental colors of the input system for each gradation of that fundamental color. Even in this case, the output color gamut after the fundamental color point has been adjusted is taken as CMY→Lab3D-LUT ($33^3$ points), and the input color gamut is taken as RGB→Lab3D-LUT ($18^3$ points). Further, before entering the flow chart, the Lab values are converted to the LCH coordinate system using the formula [L*=L*, c*=$(a^{*2}+b^{*2})^{1/2}$, H*=arc tan(b*/a*)].

Next, in Step F1 of the flow chart shown in FIG. 12, the processing of setting the six fundamental color gradations is executed. For example, the LCH values of the fundamental color gradations are extracted from the input color gamut. The input color gamut can be a color gamut with $18^3$ points. If the input color gamut is a Red color gamut, 18 gradations will have to be extracted. Here, the lightness of the input color gamut of the first gradation of red color is InputGamutRed1L*, its chroma is taken as InputGamutRed1C*, and its hue is taken as InputGamutRed1H*. In the following, for the $2^{nd}$ to the $18^{th}$ gradations the setting is made as InputGamutRed2L*, InputGamutRed2C*, InputGamutRed2H*, . . . . InputGamutRed18L*, InputGamutRed18C*, InputGamutRed18H*. Similar settings are also made for the other colors Y, G, C, B, and M.

In addition, in the LCH coordinate system, the LCH values of the fundamental color gradations are extracted from the output color gamut. In the case of a color gamut with $33^3$ points, if it is a color R gradation, 33 gradations will have to be extracted. Here, the lightness of the output color gamut of the first gradation of red color is OutputGamutRed1L*, its chroma is taken as OutputGamutRed1C*, and its hue is taken as OutputGamutRed1H*. In the following, for the $2^{nd}$ to the $33^{rd}$ gradations the setting is made as OutputGamutRed2L*, InputGamutRed2C*, OutputGamutRed2H*, . . . OutputGamutRed33L*, OutputGamutRed33C*, OutputGamutRed33H*. Similar settings are also made for the other colors Y, G, C, B, and M.

Next, in Step F2, the computation of the error (Diff) in the six fundamental color gradations is carried out. In this example, the L*, C*, H*, and Diff for 33 gradations and also for six fundamental colors is computed using linear interpolation. Here, the error in the lightness of the first gradation of the color R is taken as DiffRed1L*, its chroma error as DiffRed1C*, and its hue error as DiffRed1H*. Thereafter, even for the $2^{nd}$ to $33^{rd}$ gradations, settings are made as DiffRed2L*, DiffRed2C*, DiffRed2H*, . . . , DiffRed33L*, DiffRed33C*, DiffRed33H*. Settings are made in a similar manner ever for the other fundamental colors of Y, G, C, B, and M. As is shown in FIG. 14(A), FIG. 14(B), and FIG. 15, each of these has been plotted taking the Chroma along the X-axis, and each of the values L*, C*, and H* (0 to 100) along the Y-axis (vertical axis), and the input values of color R InputGamutRed1 to InputGamutRed18 are connected by straight lines.

Figure 14:
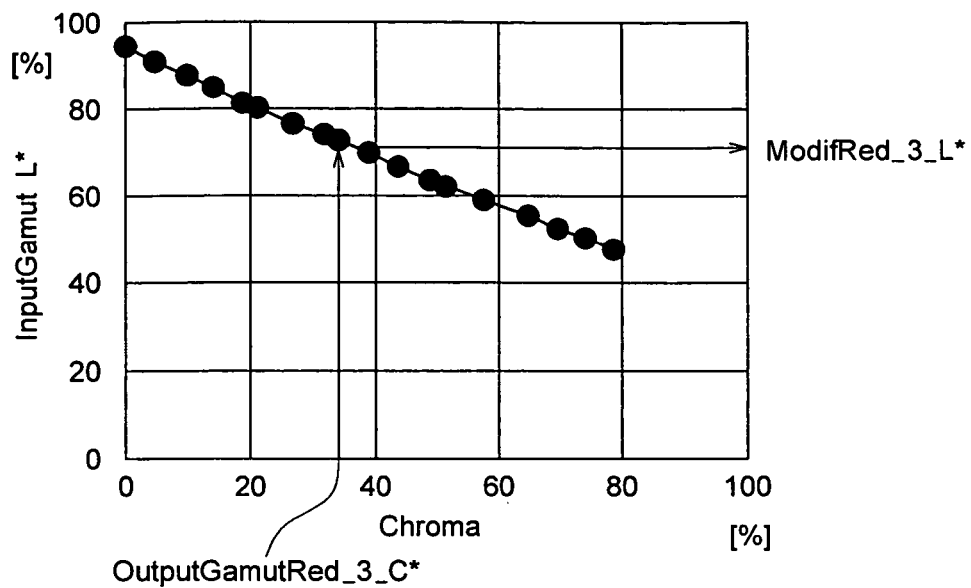
FIGS. 14(A), 14(B) are diagrams showing an example of plotting the input color lightness L* and the input chroma C* (0 to 100%) versus chroma (0 to 100%).
Figure 14:
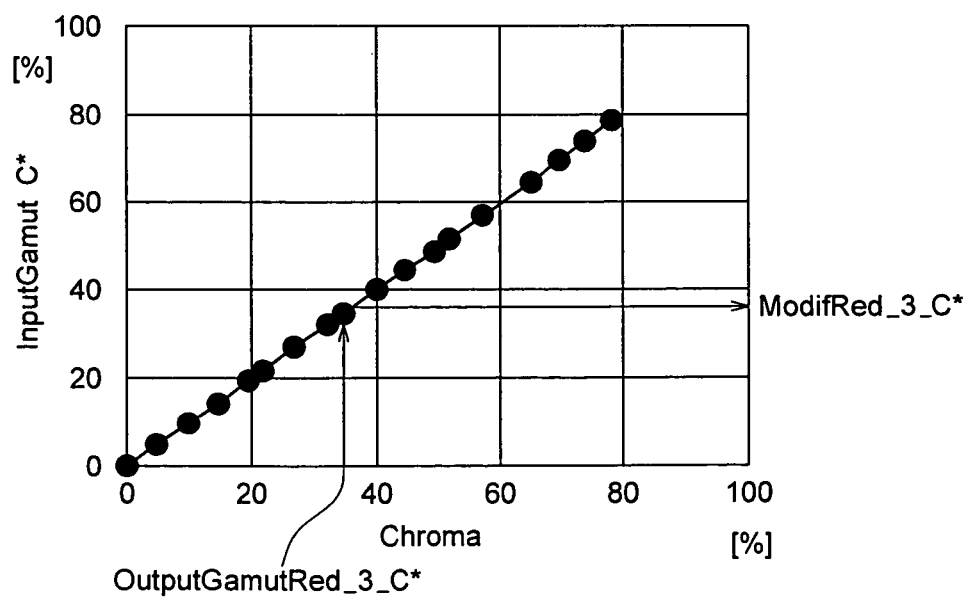

To the chroma along the horizontal axis shown in FIG. 14(A), for example, the output value of the third gradation of the color R OutputGamutRed3C* is inputted. The lightness L* at the point where this output value OutputGamutRed3C* meets the straight line becomes the modifRed3L* to which the OutputGamutRed3 has to be moved.

In a similar manner, to the chroma along the horizontal axis shown in FIG. 14(B), the output value of the third gradation of the color R OutputGamutRed3C* is inputted. The chroma C* at the point where this output value OutputGamutRed3C* meets the straight line becomes the modifRed3C* to which the OutputGamutRed3 has to be moved.

Figure 15:
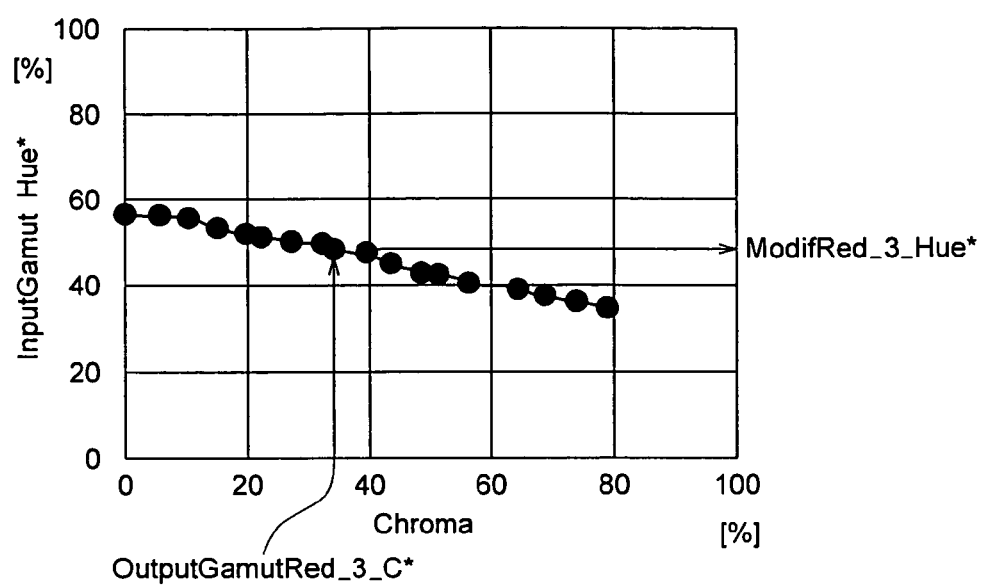
FIG. 15 is a diagram showing an example of plotting the input hue H* (0 to 100%) versus chroma (0 to 100%).

Further, to the chroma along the horizontal axis shown in FIG. 15, the output value of the third gradation of the color R OutputGamutRed3C* is inputted. The hue Hue* at the point where this output value OutputGamutRed3C* meets the straight line becomes the modifRed3Hue* to which the OutputGamutRed3 has to be moved. The lightness L*, chroma C*, and hue H* are computed by linear interpolation. With this, the L*, C*, and H* to be moved are obtained, and next, the moving distance of each gradation of the fundamental colors (the second moving distance) is computed. For example, these are obtained by Equation (8) below taking the lightness of the input value of the third gradation of the color R as InputGamutRed3L*, the lightness of the output value of the third gradation of the color R as OutputGamutRed3L*, and the error in the lightness of the third gradation of the color R as DiffRed3L*.

$$\text{DiffRed3}L^* = \text{InputGamutRed3}L^* - \text{OutputGamutRed3}L^* \quad (8)$$

Further, these are obtained by Equation (9) below taking the chroma of the input value of the third gradation of the color R as InputGamutRed3C*, the chroma of the output value of the third gradation of the color R as OutputGamutRed3C*, and the error in the chroma of the third gradation of the color R as DiffRed3C*.

$$\text{DiffRed3}C^* = \text{InputGamutRed3}C^* - \text{OutputGamutRed3}C^* \quad (9)$$

This value will always be "0".

In addition, these are obtained by Equation (10) below taking the hue of the input value of the third gradation of the color R as InputGamutRed3H*, the hue of the output value of the third gradation of the color R as OutputGamutRed3H*, and the error in the hue of the third gradation of the color R as DiffRed3H*.

$$\text{DiffRed3}H^* = \text{InputGamutRed3}H^* - \text{OutputGamutRed3}H^* \quad (10)$$

Figure 16:
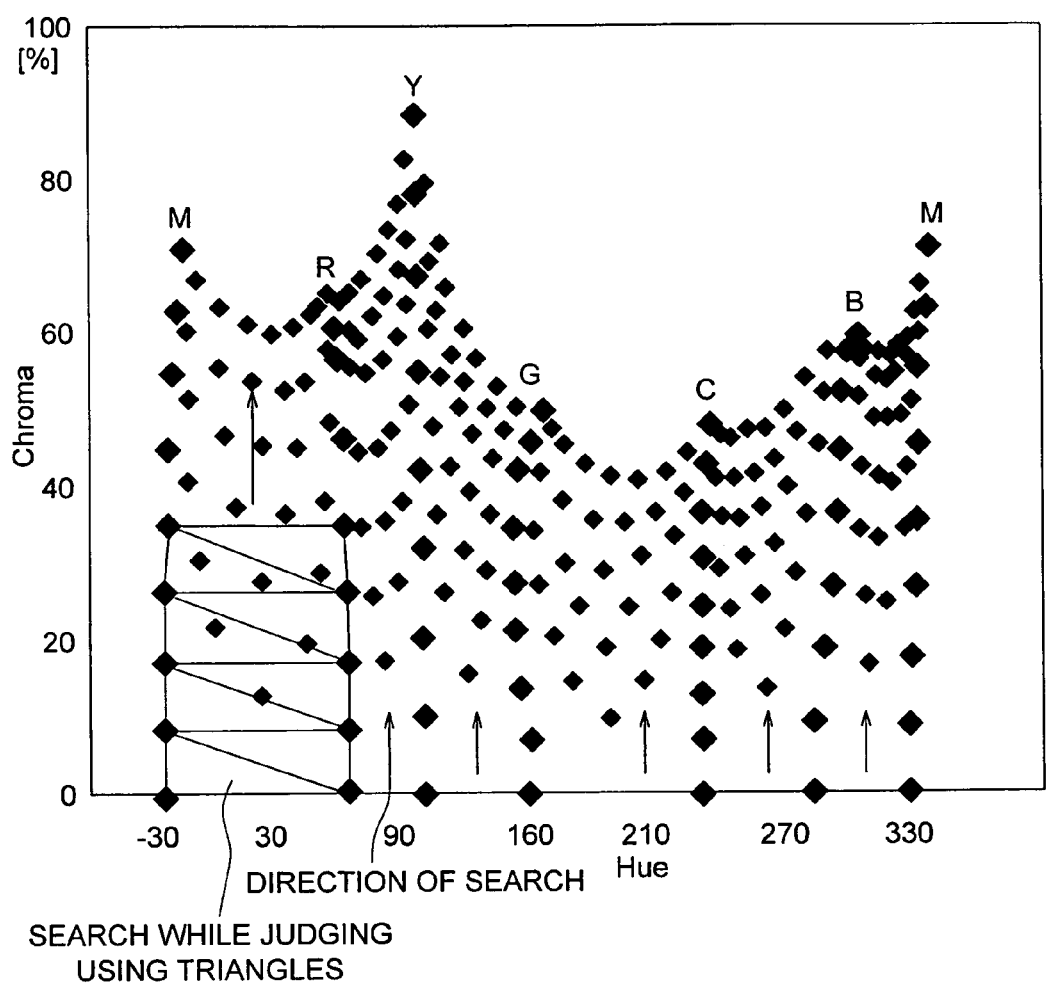
FIG. 16 is a diagram showing an example of judging the inclusion in triangles in the hue versus chroma plane.

When this is repeated for all the six fundamental colors and all the 33 gradations, the plot shown in FIG. 16 is obtained in which the horizontal axis corresponds to the hue Hue and the vertical axis corresponds to the chroma C*. In this figure, 6×33 lattice points have been plotted, correspondence is established with the data indicating the amounts of movement for the respective points, and these data items are stored in the memory.

Next, the LCH values to calculate are set in Step F3. At this time, the LCH value (L*, C*, H*) of the output color gamut is set for one point at a time and this is taken as the input value. When the calculation target points are present for $33^3$ lattice points, the loop process is repeated $33^3$ times.

Next, in Step F4, the processing of judging inclusion in triangular shape is executed. At this time, in the hue Hue-chroma C* plane as is shown in FIG. 16, when the chroma C* and the hue H* are inputted, a judgment is made as to between which lattice points is the calculation target point rin is included. In FIG. 16, the horizontal axis corresponds to the hue Hue (−30° to 330°) and the vertical axis corresponds to the chroma (0 to 100%). The three lattice points in the figure indicate the part for executing the inclusion judgment in triangular shapes. The processing of inclusion judgment in triangular shapes is done by searching in the direction of the arrow in the figure. The judgment is made by successively setting the three lattice points. At this time, the lightness L*, chroma C*, and the hue H* that have been inputted are taken as the lightness rinL*, chroma rinC*, and the hue rinH* of the calculation target point rin.

Further, the position r of the lightness L*, chroma C*, and the hue H* of the three lattice points is taken respectively as r1L, r1C, r1H, r2L, r2C, r2H, r3L, r3C, and r3H, and the moving distance s of the three lattice points will be s1L, S1C, s1H, s2L, s2C, s2H, s3L, s3C, and s3H when expressed in the s coordinate system.

Figure 17:
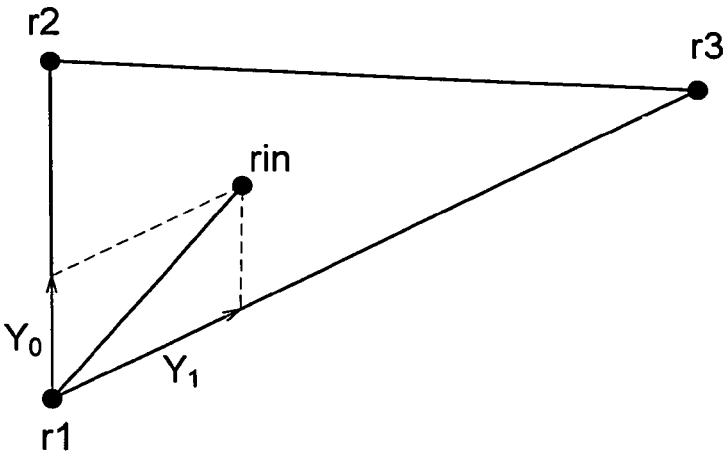
FIGS. 17(A), 17(B) are diagrams showing an example of inclusion judgment in triangles and an example of triangular interpolation.
Figure 17:
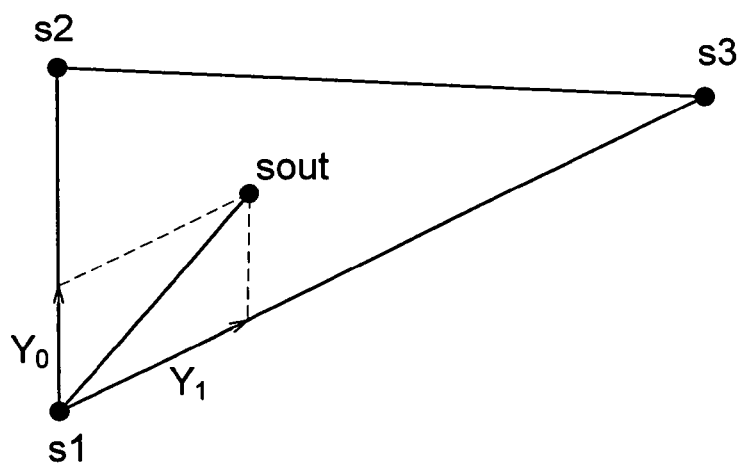

At this time, the c*H* coordinate system using the chroma c* and hue H* at the position r is set as shown in FIG. 17(A), if the vector between the positions r2-r1 and the vector between the positions r3-r1 are denoted respectively by $Y_0$ and $Y_1$, it is possible to express the vectors between the positions rin-r1 using $Y_0$ and $Y_1$ by the Equation (11) below.

$$\text{rin}C - r1C = Y_0 \cdot (r2C - r1C) + Y_1 \cdot (r3C - r1C)$$

$$\text{rin}H - r1H = Y_0 \cdot (r2H - r1H) + Y_1 \cdot (r3H - r1H) \quad (11)$$

The values of $Y_0$ and $Y_1$ are derived (obtained) from this relationship. If $Y_0$ and $Y_1$ are satisfying the following conditions, then it is judged that the calculation target point rin is included in that color gamut. These conditions are taken as $Y_0 + Y_1 < 1.0$, $Y_0 > 0$, $Y_1 > 0$.

Next, in Step F6, the processing of computing the moving distance is executed. In this example, a similar equation is also valid in the triangular interpolation shown in FIG. 17(B) (coordinate system of the moving distance: s coordinate system). As has been shown in FIG. 17(B), if the vector of the moving distance between s2-s1 and the vector of the moving distance between s3-s1 are denoted respectively by $Y_0$ and $Y_1$, and next, the vector of the moving distance between sout-s1 can be expressed by the Equation (12) given below using $Y_0$ and $Y_1$, taking the moving distance Sout of the calculation target point rin to be SoutL, SoutC, and SoutH respectively for the lightness L*, chroma C*, and hue H*.

$$SoutL = Y_0 \cdot (r2L - r1L) + Y_1 \cdot (r3L - r1L) + s1L$$

$$SoutC = Y_0 \cdot (r2C - r1C) + Y_1 \cdot (r3C - r1C) + s1C$$

$$SoutH = Y_0 \cdot (r2H - r1H) + Y_1 \cdot (r3H - r1H) + s1H \quad (12)$$

The new LCH value is obtained from these SoutL, SoutC, and SoutH. Here, if the new LCH values are denoted by NewL*, NewC*, and NewH*, they can be expressed by the following Equation (13).

$$NewL^* = L^* + SoutL$$

$$NewC^* = C^* + SoutC$$

$$NewH^* = H^* + SoutH \quad (13)$$

After that, in Step F7, the end judgment processing is executed. Here, the judgment is made as to whether the processing of adjusting the positions for all the gradations of all the fundamental colors for the $33^3$ input values. If these adjustment processings have not been completed, the operation returns to the step of setting the LCH value to calculate and the above processing is repeated. If the adjustment processings have been completed, the color gamut of the $33^3$ LCH data D14 for which adjustment processing has been made is converted using the formula [L*=L*, a*=C*·cos(H*/180π), b*=sin(H*/180π)] and returned to the Lab coordinate system.

Figure 18:
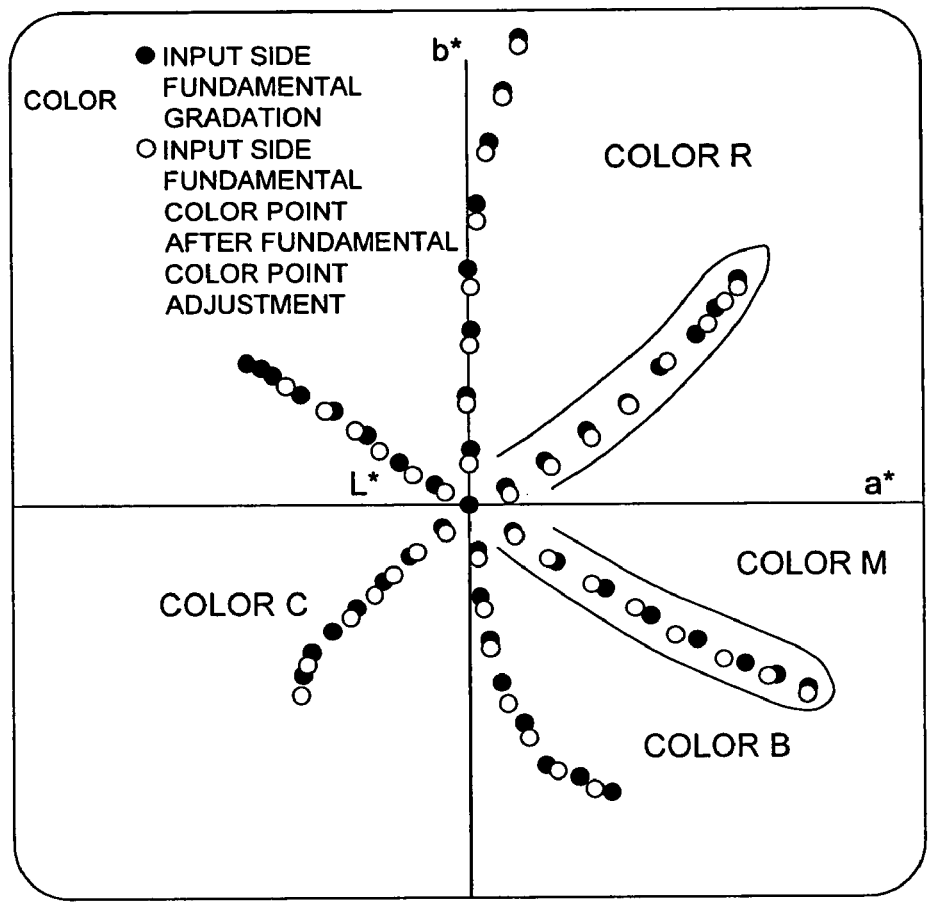
FIG. 18 is a diagram showing an example of plotting the color gradations after adjusting the six fundamental colors.

With this, it is possible to superimpose the color gamut of the fundamental color gradations of the input side shown in FIG. 18 with the color gamut of the fundamental color gradations after adjustment on the output side. In FIG. 18, the horizontal axis is the chroma a* of the color M, and the vertical axis is the chroma b* of the color Y. This has been obtained by moving the output side fundamental color gradations over to the input side fundamental color gradations. The filled circles in the figure denote the input side fundamental color gradations and the open circles indicate the output side fundamental color gradations.

Next, the operation returns to Step A42 shown in FIG. 4, and after that, the operation moves to Step A5, and the Lab values to calculate are set in the Lab coordinate system. At this time, the CMY values corresponding to each of the Lab values of the RGB→Lab3D-LUT are computed from the CMY→Lab3D-LUT. The calculation target point in this Lab coordinate system is taken as pin.

Next, the operation moves on to Step A6, the Lab value set (input) earlier is searched from CMY→Lab3D-LUT, and a judgment is made as to whether this Lab value is inside or outside the color gamut of the corresponding CMY→Lab3D-LUT (inside or outside color gamut judgment processing). Here, at first, regarding the CMY values of the CMY→Lab3D-LUT, the center value of that calculation reference point, which is the $16^{th}$ Lab value of C=M=Y, is taken as pc, and the three points that form the vertices of the triangle in the surface of that CMY→Lab3D-LUT are set successively (triangle setting processing). In this example, the surface that becomes the smallest unit in the color gamut surface is a triangle formed by three input data D1.

The Lab values of the three vertex points are taken to be p1, p2, and p3, respectively. In a similar manner, the CMY values of the addresses of this calculation reference point and the vertices are taken to be qc, q1, q2, and q3. Also, $X_0$, $X_1$, and $X_2$ are, for example, the weighting factors in the Lab coordinate system set for the calculation reference point taking the center value pc of the Lab values. This example is a case in which the calculation target point with a Lab value equal to pc has been assigned at a position at which it penetrates the triangle with the Lab values of its vertices being p1, p2, and p3.

Here, regarding the Lab values of CMY→Lab3D-LUT, when its center value of C=M=Y=$16^{th}$ Lab value is taken as the calculation reference point pc, the calculation target point is taken as pin, the Lab values of the three vertices set on the surface of this CMY→Lab3D-LUT are taken as p1, p2, and p3, and the weighting factors in the Lab coordinate system set for the calculation reference point pc are taken as $X_0$, $X_1$, and $X_2$, the relationship between the calculation reference point pc and the calculation target point pin is given by the following Equation (14).

Equation 1:

$$pin - pc = \begin{bmatrix} p1 - pc \\ p2 - pc \\ p3 - pc \end{bmatrix} \cdot (X_0 \quad X_1 \quad X_2) \quad (14)$$

Figure 19:
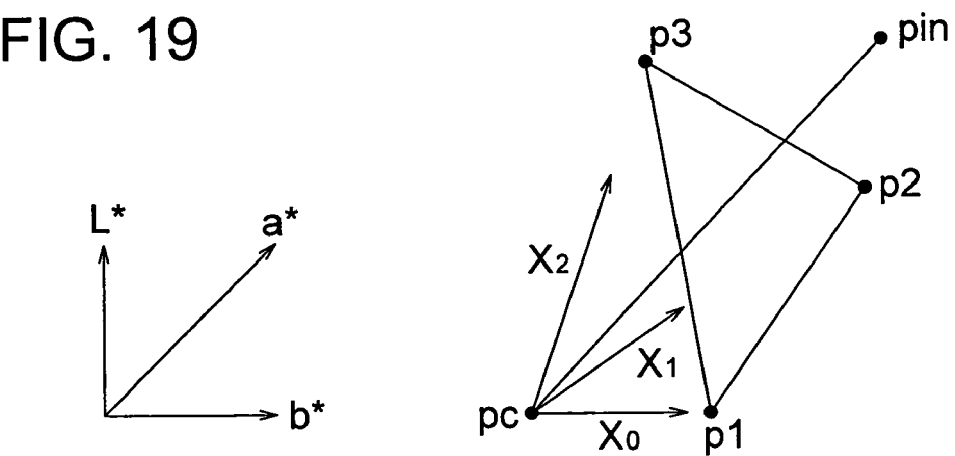
FIG. 19 is a diagram showing an example of color gamut surface search of the calculation target point pin in the Lab coordinate system.

FIG. 19 is a diagram showing an example of color gamut surface search of the calculation target point pin in the Lab coordinate system. According to the example of the color gamut surface search shown in FIG. 19, a search is made of which color gamut surface in the color gamut surface of the input data D11 does the straight line connecting the input RGB value of the calculation target point pin and the center RGB value of the calculation reference point pc intersect. For example, the Lab value set (input) in the image processing section 76 is searched from the CMY→Lab3D-LUT.

This equation of relationship is solved and the weighting factors $X_0$, $X_1$, and $X_2$ are obtained. At this time, if $X_0$>0, $X_1$>0, and $X_2$>0, and also, $(X_0+X_1+X_2)$<1, it implies that the calculation target point is within the printer color gamut. Further, if $X_0$>0, $X_1$>0, and $X_2$>0, and also, $(X_0+X_1+X_2) \geq 1$, it implies that the calculation target point is outside the printer color gamut.

As a result of carrying out the process of judging inside or outside color gamut described above, if the calculation target point pin is judged to be outside the printer color gamut, the operation moves on to Step A6 in which, using CMY→Lab3D-LUT, for example, using the external insertion processing mode that utilizes the following Equation (15) and its expanded equation, the CMY value (qout) corresponding to the input Lab value is computed (external insertion processing mode).

Figure 20:
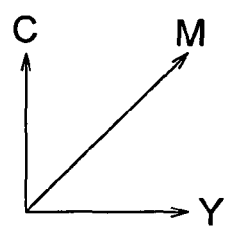
FIG. 20 is a diagram showing an example of color gamut surface search in the CMY coordinate system.
Figure 20:
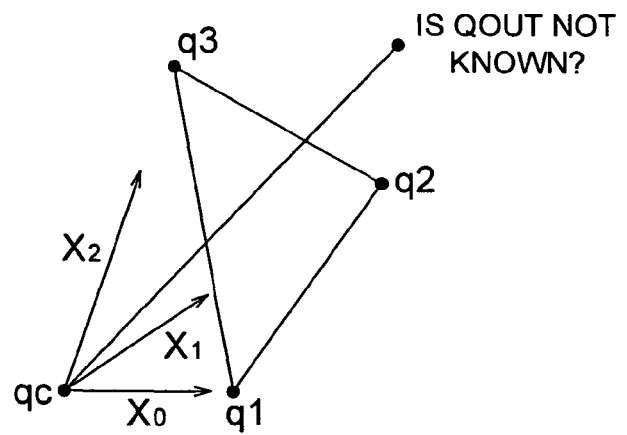

Here, the Equation (15) used in the external insertion processing mode is explained. Equation (15) is obtained by the color gamut surface search processing in the CMY coordinate system. FIG. 20 is a diagram showing an example of color gamut surface search in the CMY coordinate system. According to the example of color gamut surface search, the output CMY value of the calculation reference point being pc in the CMY coordinate system, and the CMY values of the different vertices being q1, q2, and q3, the external insertion processing mode computes the CMY value (qout) corresponding to the input Lab values.

Here, regarding the CMY values of the CMY→Lab3D-LUT, when the CMY value of that calculation target point is taken as qout, and the CMY values of the addresses of the lattice points set on the surface of that CMY→Lab3D-LUT are taken to be q1, q2, and q3, the CMY value of the address set at the calculation reference point is taken as qc, and the weighting factors in the Lab coordinate system set for the calculation reference point pc are taken as $X_0$, $X_1$, and $X_2$, the value of qout is obtained by the following Equation (15).

Equation 2:

$$qput = \begin{bmatrix} q1 - qc \\ q2 - qc \\ q3 - qc \end{bmatrix} \cdot (X_0 \quad X_1 \quad X_2) + qc \quad (15)$$

Expanding this equation, we get:

$q\text{out}\_C = (q1\_C\text{-}qc\_C) \times X_0 + (q2\_C\text{-}qc\_C) \times X_1 + (q3\_C\text{-}qc\_C) \times X_2 + qc\_C$ $q\text{out}\_M = (q1\_M\text{-}qc\_M) \times X_0 + (q2\_M\text{-}qc\_M) \times X_1 + (q3\_M\text{-}qc\_M) \times X_2 + qc\_M$ $q\text{out}\_Y = (q1\_Y\text{-}qc\_Y) \times X_0 + (q2\_Y\text{-}qc\_Y) \times X_1 + (q3\_Y\text{-}qc\_Y) \times X_2 + qc\_Y$ Negative values are obtained at the time of computing this Equation (15). Further, it is possible to evaluate this Equation (15) beforehand and store the results in the ROM of the image processing section 76.

As a result of carrying out the process of judging inside or outside color gamut described above, if the calculation target point pin is judged to be inside the printer color gamut, the operation moves on to Step A7 in which, using the Lab value set earlier, the CMY value is searched by inclusion judgment within the CMY→Lab3D-LUT, and the CMY value corresponding to this inclusion judgment is computed. In order carry out this inclusion judgment, the Lab values of four points (points p4, p5, p6, and p7) are set successively from inside the CMY→Lab3D-LUT. In a similar manner, the CMY values of four points (points q4, q5, q6, and q7) are set (Triangular pyramid setting process).

Figure 21:
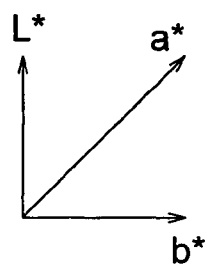
FIG. 21 is a diagram showing an example of inclusion judgment in the Lab coordinate system.
Figure 21:
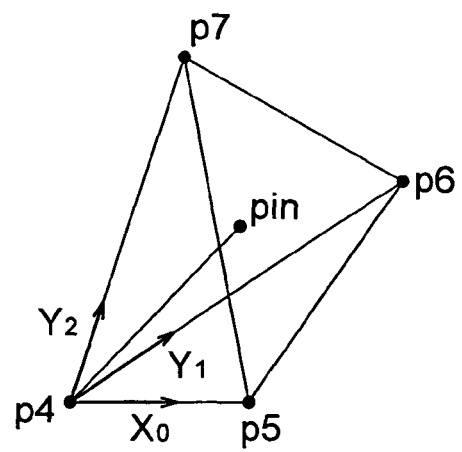

Here, the inclusion judgment in the Lab coordinate system is explained. FIG. 21 is a diagram showing an example of inclusion judgment in the Lab coordinate system. According the inclusion judgment shown in FIG. 21, the judgment is made as to whether or not the input RGB value of the calculation target point pin is included in the range of the plot of input RGB values (inclusion judgment processing). In this example, in the $5^3$ points of input data D11, the number of lattice points with the smallest unit of volume, is four lattice points forming a triangular pyramid. In this example, the triangular pyramid setting process is executed, and triangular pyramids are set successively from among a plurality of triangular pyramids. The Lab values of the lattice points of the triangular pyramid set here is taken as p4, p5, p6, and p7. Also, $Y_0$, $Y_1$, and $Y_2$ are, for example, the weighting factors in the Lab coordinate system set for the calculation reference point taking the center value pc of the Lab values. This example is a case in which the calculation target point with a Lab value equal to pin has been assigned at a position inside the triangular pyramid the Lab values of whose lattice points become p4, p5, p6, and p7.

Here, regarding the Lab values of the CMY→Lab3D-LUT, when its center value of $C=M=Y=16^{th}$ Lab value is taken as the calculation reference point pc, the calculation target point is taken as pin, the Lab values of the three lattice points set on the surface of this CMY→Lab3D-LUT are taken as p4, p5, p6, and p7, and the weighting factors in the Lab coordinate system set for the calculation reference point p4 are taken as $Y_0$, $Y_1$, and $Y_2$, the relationship between the calculation reference point p4 and the calculation target point pin is given by the following Equation (16).

Equation 3:

$$pin - p4 = \begin{bmatrix} p5 - p4 \\ p6 - p4 \\ p7 - p4 \end{bmatrix} \cdot (Y_0 \quad Y_1 \quad Y_2) \quad (16)$$

Figure 22:
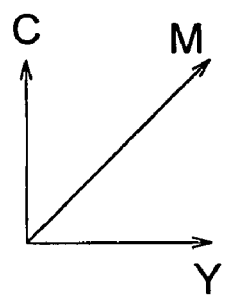
FIG. 22 is a diagram showing an example of inclusion judgment in the CMY coordinate system.
Figure 22:
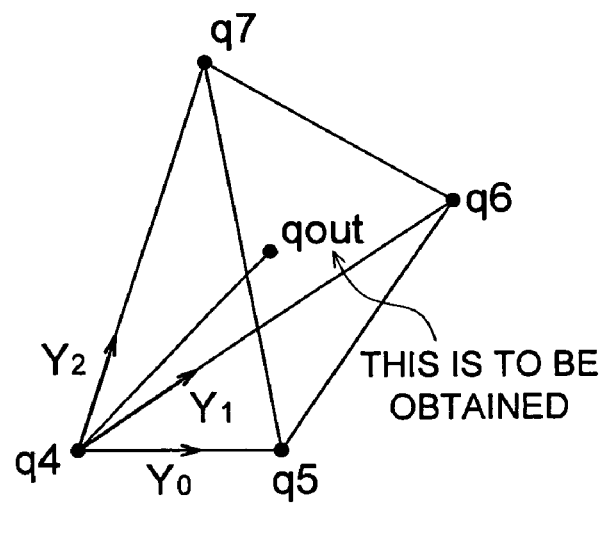

The weighting factors $Y_0$, $Y_1$, and $Y_2$ are obtained from this equation of relationship. At this time, if $Y_0 > 0$, $Y_1 > 0$, and $Y_2 > 0$, and also, $(Y_0 + Y_1 + Y_2) < 1$, it implies that the calculation target point is within the triangular pyramid. Therefore, the corresponding CMY value (qout) is obtained from the weighting factors $Y_0$, $Y_1$, and $Y_2$ and the Lab values q4, q5, q6, and q7 of the four lattice points. For example, the CMY value (qout) corresponding to the input Lab value is computed using the internal insertion processing mode using the Equation (17) and its expanded equation to be described in FIG. 22 (internal insertion processing mode). FIG. 22 is a diagram showing an example of inclusion judgment in the CMY coordinate system. According to the example of inclusion judgment shown in FIG. 22, when the CMY value of the calculation reference point is taken as q4 in the CMY coordinate system, and the CMY values of the different lattice points are taken as q4, q5, q6, and q7, the internal insertion processing mode computes the CMY value (qout) corresponding to the input Lab values.

Here, regarding the CMY values of the CMY→Lab3D-LUT, when the CMY value of that calculation target point is taken as qout, and the CMY values of the addresses of the lattice points set on the surface of that CMY→Lab3D-LUT are taken to be q5, q6, and q7, the CMY value of the address set at the calculation reference point is taken as q4, and the weighting factors in the Lab coordinate system set for the calculation reference point q4 are taken as $Y_0$, $Y_1$, and $Y_2$, the value of qout is obtained by the following Equation (17).

Equation 4:

$$qput = \begin{bmatrix} q5 - q4 \\ q6 - q4 \\ q7 - q4 \end{bmatrix} \cdot (Y_0 \quad Y_1 \quad Y_2) + q4 \quad (17)$$

Expanding this equation, we get:

$q\text{out}\_C = (q5\_C\text{-}q4\_C) \times Y_0 + (q6\_C\text{-}q4\_C) \times Y_1 + (q7\_C\text{-}q4\_C) \times Y_2 + q4\_C$ $q\text{out}\_M = (q5\_M\text{-}q4\_M) \times Y_0 + (q6\_M\text{-}q4\_M) \times Y_1 + (q7\_M\text{-}q4\_M) \times Y_2 + q4\_M$ $q\text{out}\_Y = (q5\_Y\text{-}q4\_Y) \times Y_0 + (q6\_Y\text{-}q4\_Y) \times Y_1 + (q7\_Y\text{-}q4\_Y) \times Y_2 + q4\_Y$ Further, it is possible to evaluate the Equation (16) and Equation (17) beforehand and store the results in the ROM of the image processing section 76.

After that, the operation moves on to Step A9, and a judgment is made as to whether or not all the processing of computing the CMY values for the Lab values set (input) earlier has been completed. If this processing has not been completed, the operation returns to Step A5 and the above processing is repeated. When the processing of computing the CMY values for all the Lab values has been completed, the RGB→CMY3D-LUT is generated.

Next, the operation moves on to Step A10, and the RGB→CMY3D-LUT is converted into RGB→CMYK3D-

LUT using a GCR (pre-processing of ROM writing). In this example, each of the CMY values of the RGB→CMY3D-LUT is converted into the corresponding CMYK value using a GCR algorithm. Since this conversion computation equation is as has been described earlier, its explanation is omitted here. With this, it is possible to generate the RGB→CMYK3D-LUT.

When the above processing has been completed, the operation moves on to Step A11, and the ROM data Dout constituting the RGB→CMYK3D-LUT is written in the ROM 40. For example, since the ROM data Dout constituting the RGB→CMYK3D-LUT has been stored in the RAM inside the control section 75, the data is transferred from the RAM to the ROM writer 77, and is then written into the ROM, etc. With this, it is possible to prepare a ROM 40 in which the RGB→CMYK3D-LUT has been stored.

According to the information generation apparatus 70 and the method of generating color conversion table as a preferred embodiment in this manner, when converting the three color RGB input system color image signals R, G, and B into the four color CMYK output system color image signals C, M, Y, and K, it is possible to establish correspondence between the color gamuts of the input system color image signals and the color gamut of the output system color image signals for each of the gradations including the maximum gradations of those fundamental colors.

Therefore, the positions of the maximum gradations of fundamental colors of the output system are moved to the positions of the maximum gradations of fundamental colors of the input system and the calculation target point is corrected. After that, compared to the case of carrying out linear interpolation of the positions other than that of the maximum gradations of the fundamental colors, it is possible to reduce the extent of mixing of other colors to a fundamental color. Because of this, it becomes possible to reproduce not only fundamental colors but also colors other than fundamental colors without color mixing, and hence it becomes possible to generate a color conversion table that makes it possible to reproduce high quality color images. Because there is no color mixing, it has become possible to reduce the wasteful consumption of toner.

Figure 23:
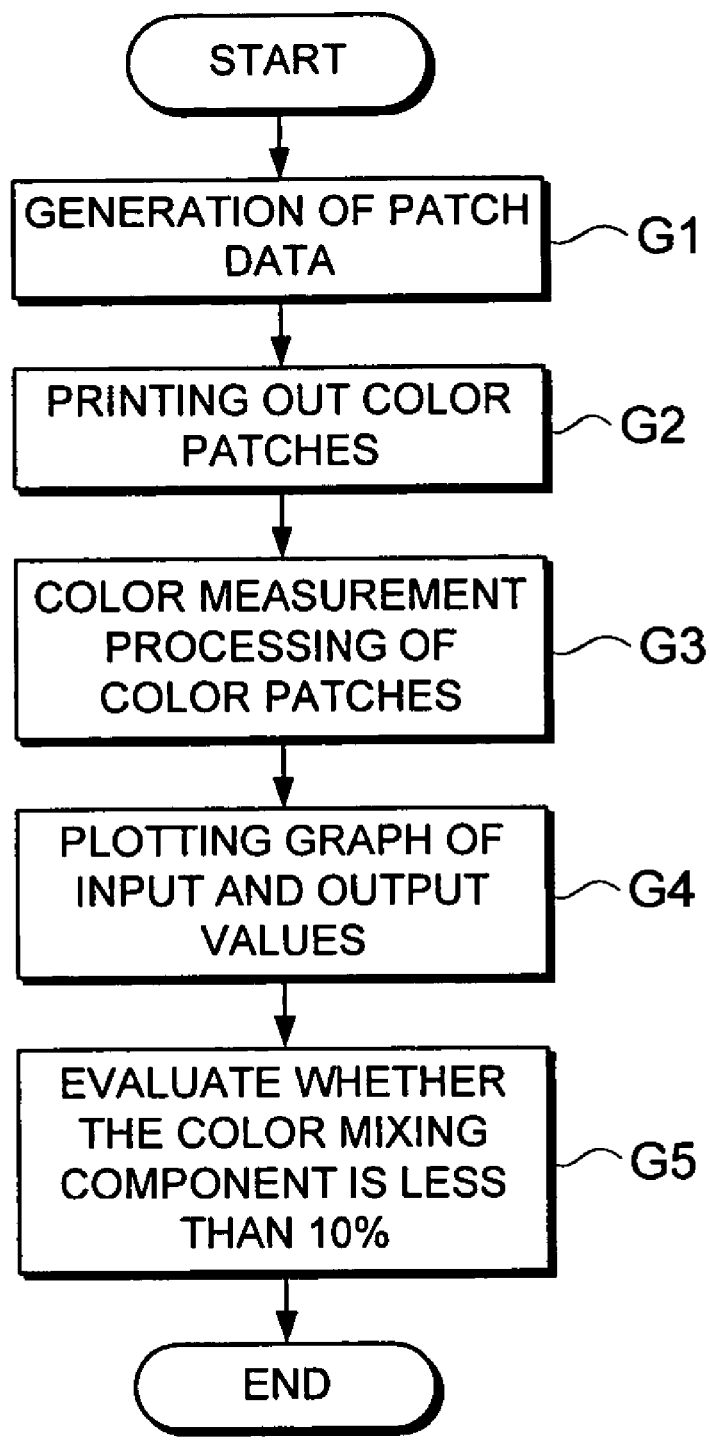
FIG. 23 is a flow chart showing an example of evaluation of the fundamental color reproduction capability.

Example of Evaluation of Fundamental Color Reproduction:

Next, the present preferred embodiment is compared with the conventional example 1 and the conventional example 2 and the ability to reproduce fundamental colors is evaluated. FIG. 23 is a flow chart showing an example of evaluation of the fundamental color reproduction capability. FIG. 24 to FIG. 31(F) are diagrams supplementing this.

To begin with, the patch data is generated in Step G1 in the flow chart shown in FIG. 23. For the patch data, the RGB value of a fundamental color gradation on the input side is inputted to the conventional example 1, the conventional example 2, and to the RGB→3D-LUT generated using the color conversion table according to the present preferred embodiment, and the CMYK value corresponding to that address is used as the patch data.

Figure 32:
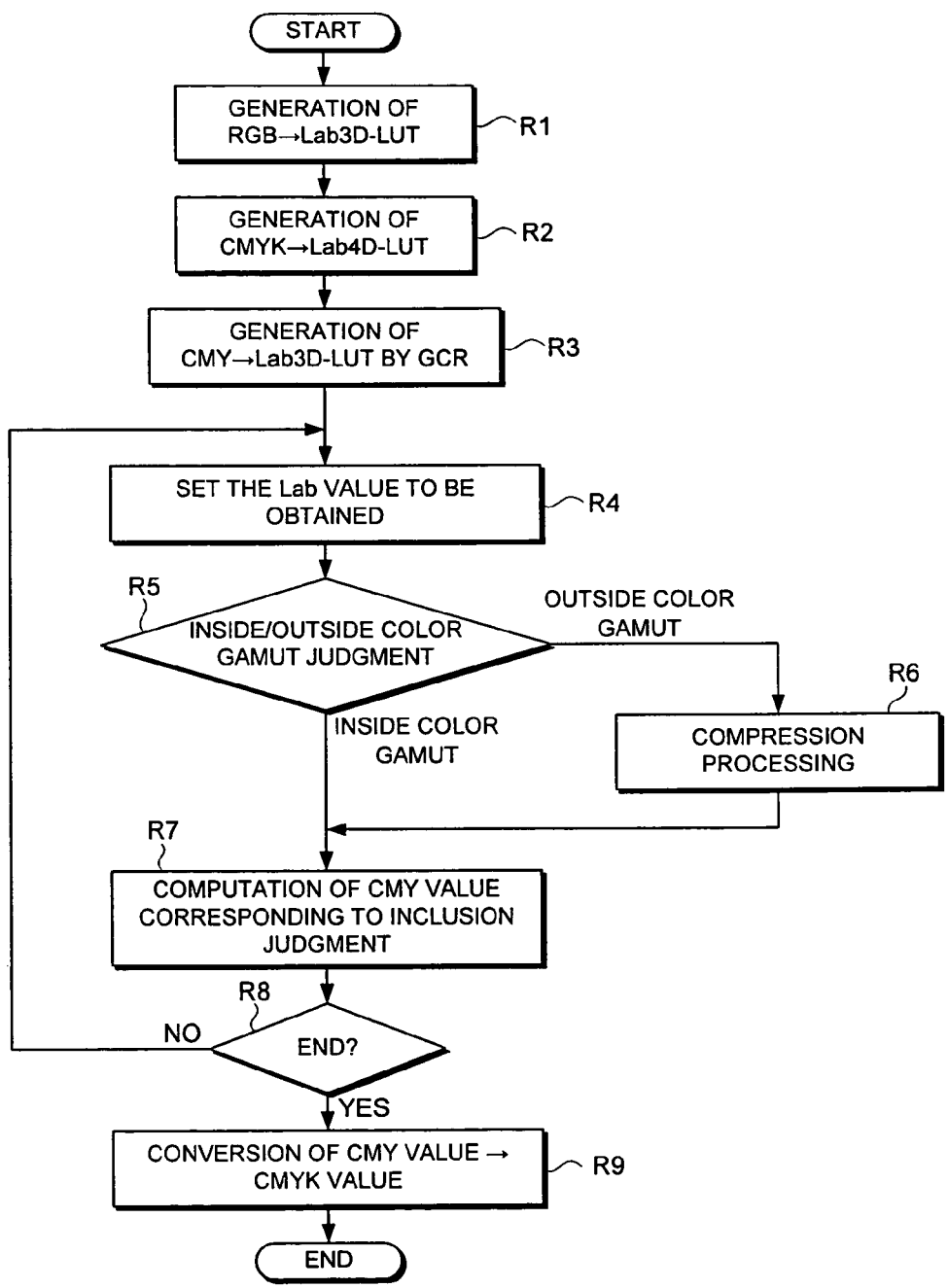
FIG. 32 is a flow chart showing an example of generating the RGB→CMYK3D-LUT in the conventional examples.
Figure 33:
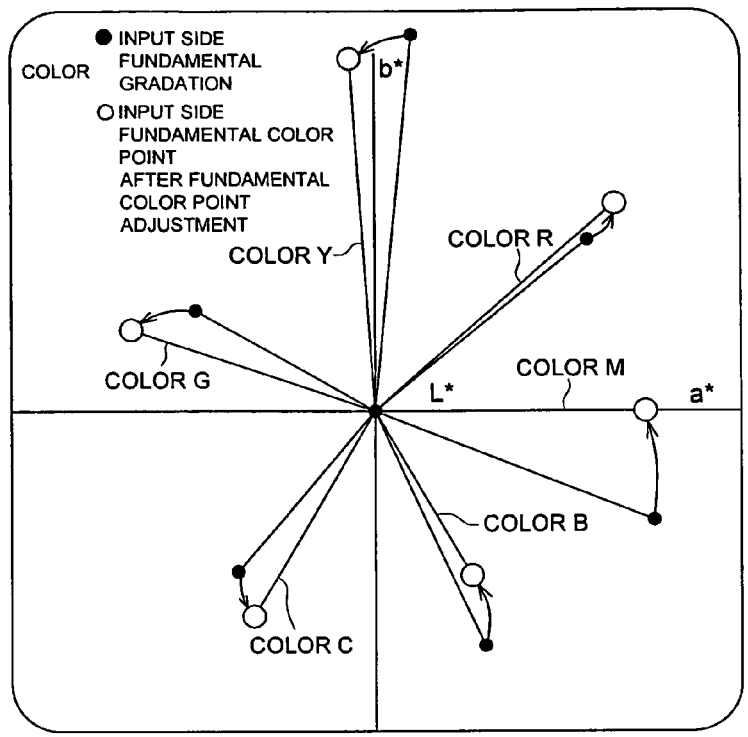
FIGS. 33(A), 33(B) are diagrams showing an example of the relationship between the input side fundamental color gradation and the output side fundamental color gradation in the conventional example 1.
Figure 33:
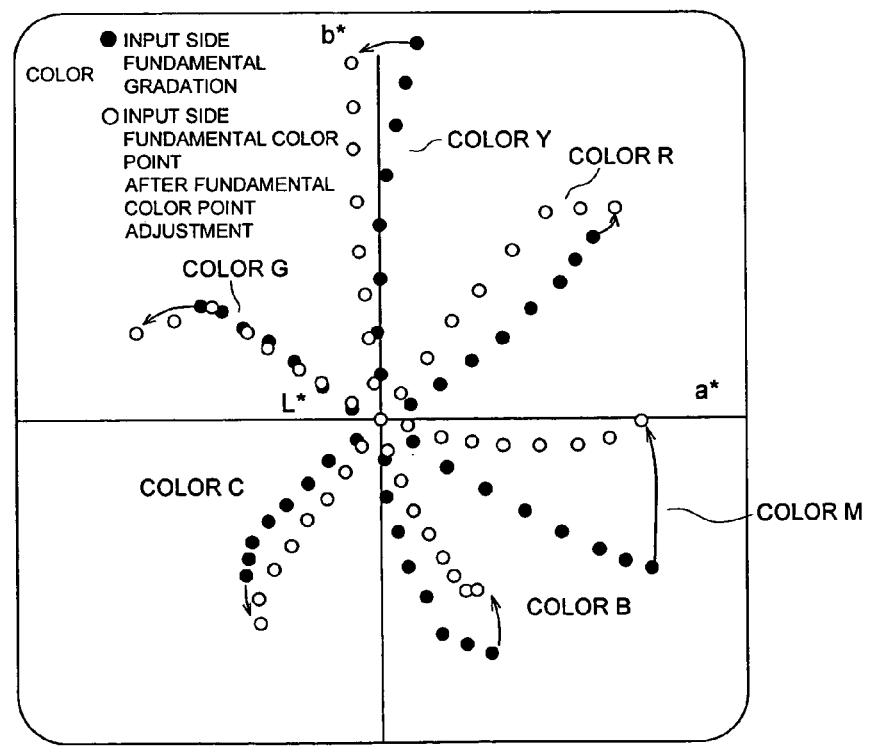
Figure 34:
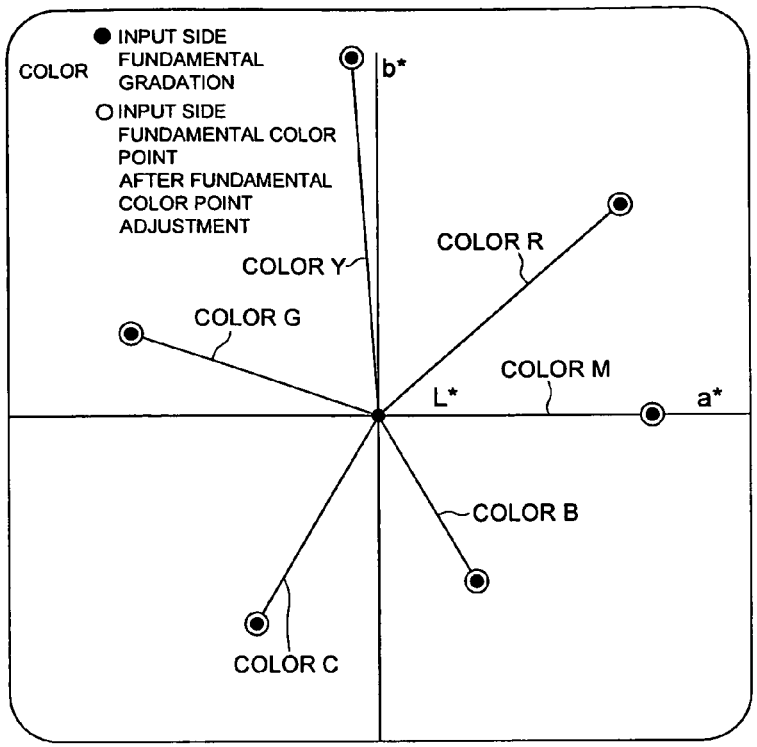
FIGS. 34(A), 34(B) are diagrams showing an example of the relationship between the input side fundamental color gradation and the output side fundamental color gradation in the conventional example 2.
Figure 34:
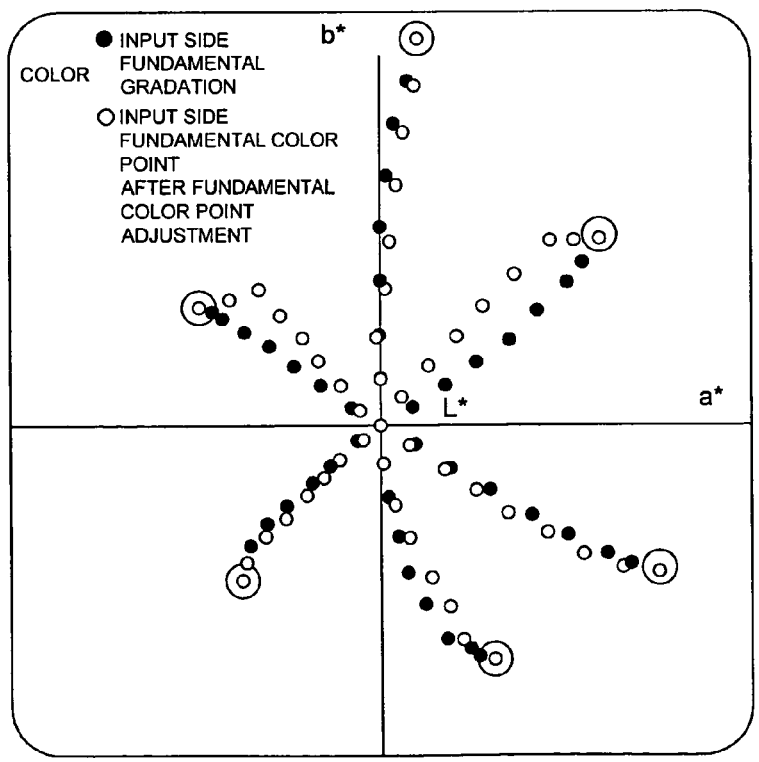

Here, the conventional example 1 is the case when an RGB→3D-LUT generated based on the flow chart of FIG. 32 is used. The conventional example 2 is the case in which the RGB→3D-LUT used is one that has been generated by omitting the Step G42 after executing the Step G41 during the Step G4 in the flow chart of FIG. 4. The present preferred embodiment is the case in which the RGB→3D-LUT used is generated by executing both the Step G41 and Step G42 in the flow chart of FIG. 4.

Next, in Step G2, the color patch based on the patch data is printed out. In the example of constructing the color patch of the colors CMYRGB shown in FIG. 24, the vertical numbers indicate the sample numbers (1 to 9). The colors CMYRGB are arranged sequentially from left to right in the color patch.

Figure 24:
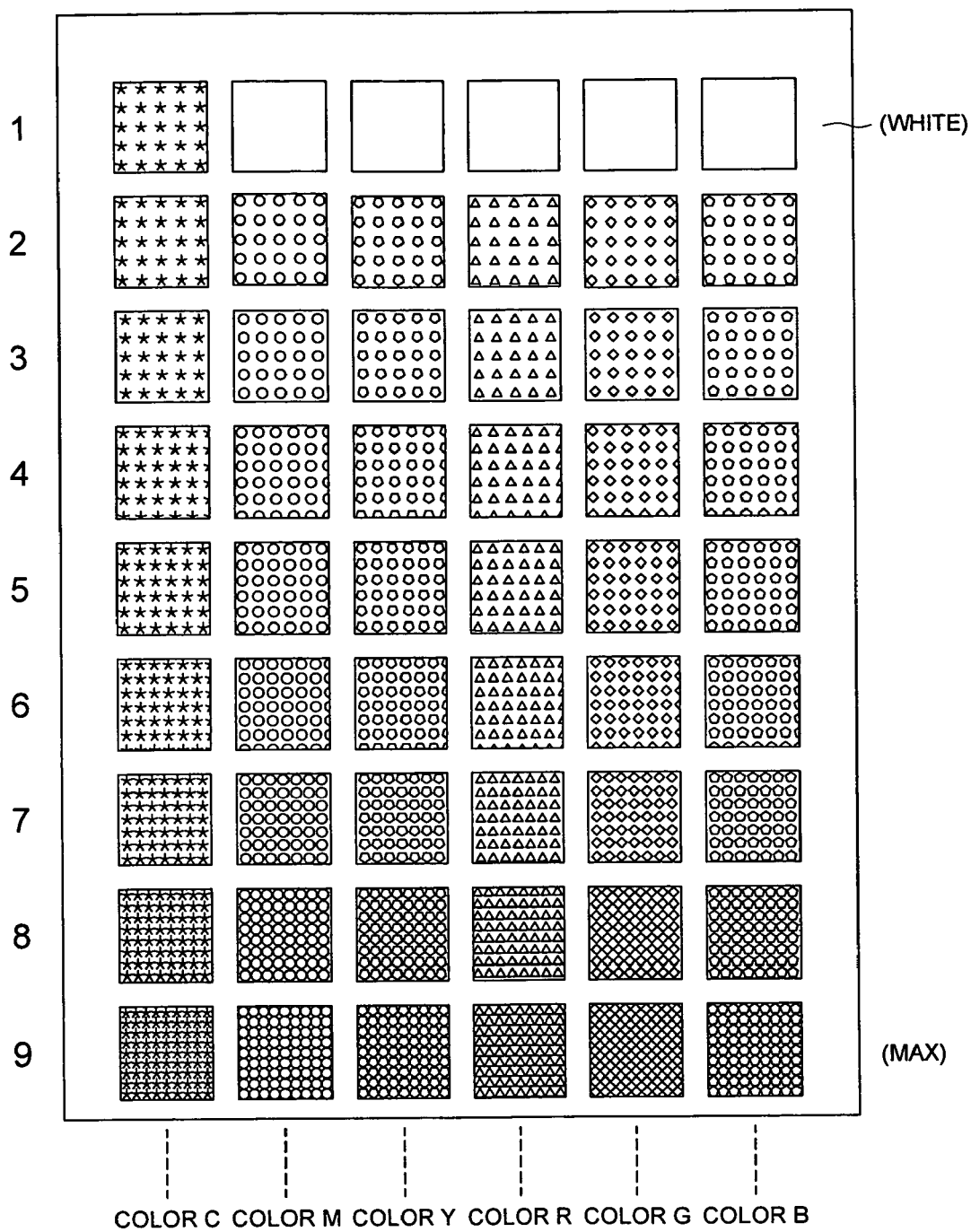
FIG. 24 is a diagram showing a sample configuration of a color patch of CMYRGB colors.

In the example of the relationship between the sample numbers 1 to 9 of the color patches of the color C shown in FIG. 25(A) and the fundamental colors, regarding the color patch of the colors CMYRGB shown in FIG. 24, the gradations of the colors G and B are both 255 (White), and the gradation of the color R is from 0 to 255 and changes in 32 stages of gradations. In the example of the relationship between the sample numbers 1 to 9 of the color patches of the color R shown in FIG. 25(B) and the fundamental colors, the gradation of the color R is 255 (White). The gradations of the colors G and B are from 0 to 255 and change in 32 stages of gradations.

In the example of the relationship between the sample numbers 1 to 9 of the color patches of the color M shown in FIG. 26(A) and the fundamental colors, the gradations of the colors R and B are both 255 (White), and the gradation of the color G is from 0 to 255 and changes in 32 stages of gradations. In the example of the relationship between the sample numbers 1 to 9 of the color patches of the color G shown in FIG. 26(B) and the fundamental colors, the gradation of the color G is 255 (White). The gradations of the colors R and B are from 0 to 255 and change in 32 stages of gradations.

In the example of the relationship between the sample numbers 1 to 9 of the color patches of the color Y shown in FIG. 27(A) and the fundamental colors, the gradations of the colors R and G are both 255 (White), and the gradation of the color B is from 0 to 255 and changes in 32 stages of gradations. In the example of the relationship between the sample numbers 1 to 9 of the color patches of the color B shown in FIG. 27(B) and the fundamental colors, the gradation of the color B is 255 (White). The gradations of the colors R and G are from 0 to 255 and change in 32 stages of gradations.

Figure 28:
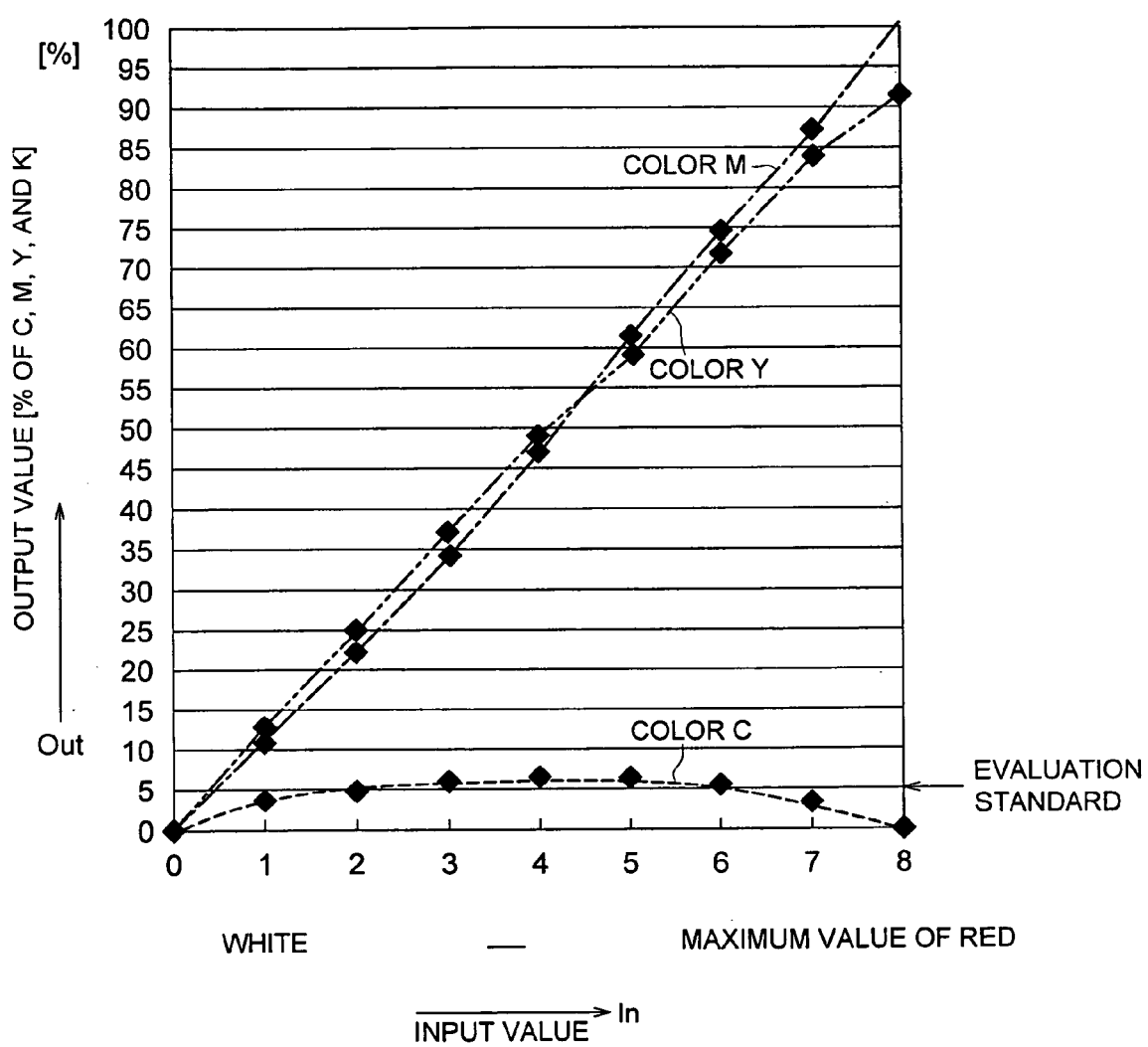
FIG. 28 is a diagram showing an example of the relationship between the input values (white-red maximum) and the output values [%] of the colors C, M, Y, and K.
Figure 29:
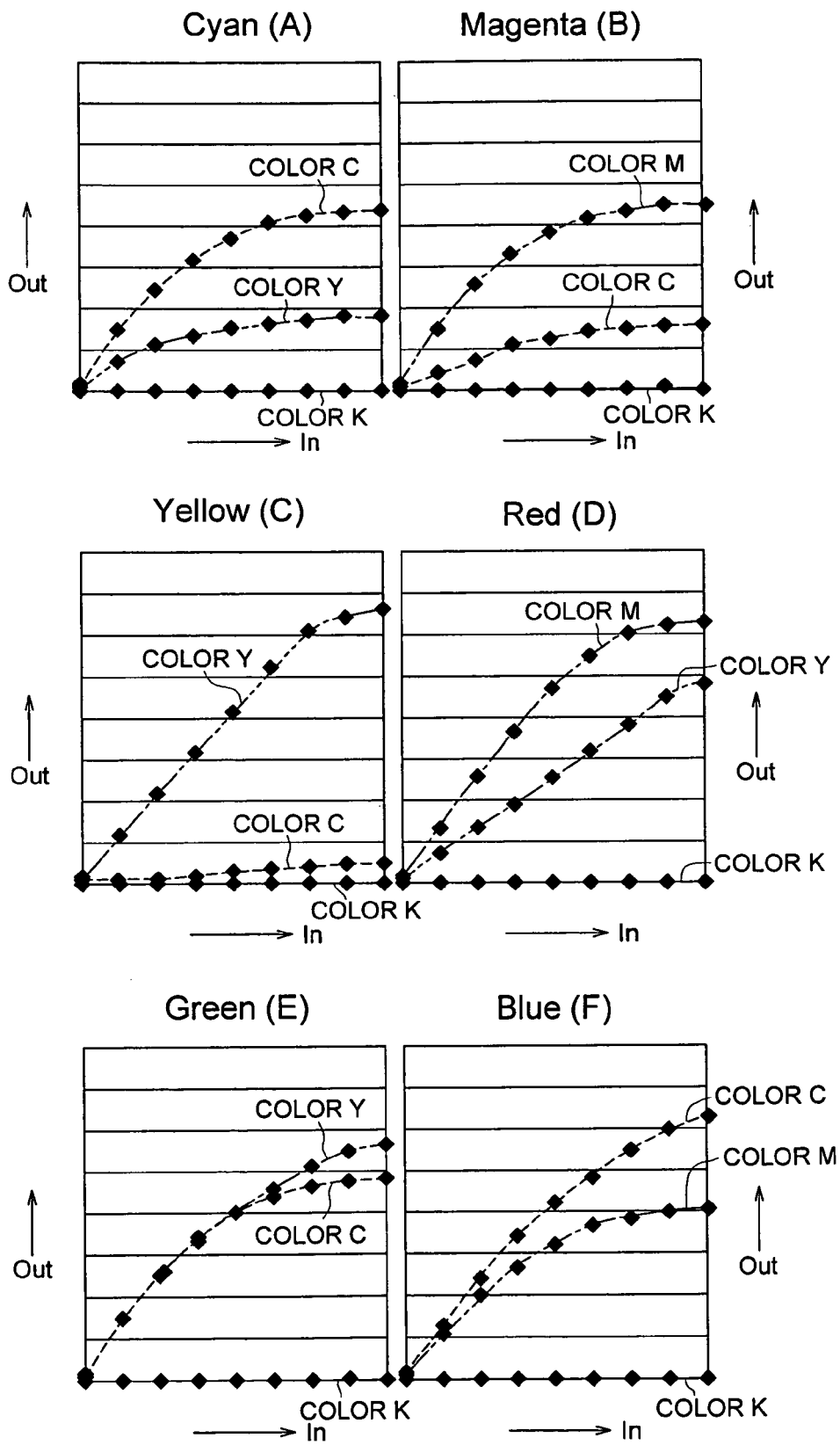
FIGS. 29(A)-29(F) are diagrams showing an example of input-output conversion of the six fundamental colors in the conventional example 1.
Figure 30:
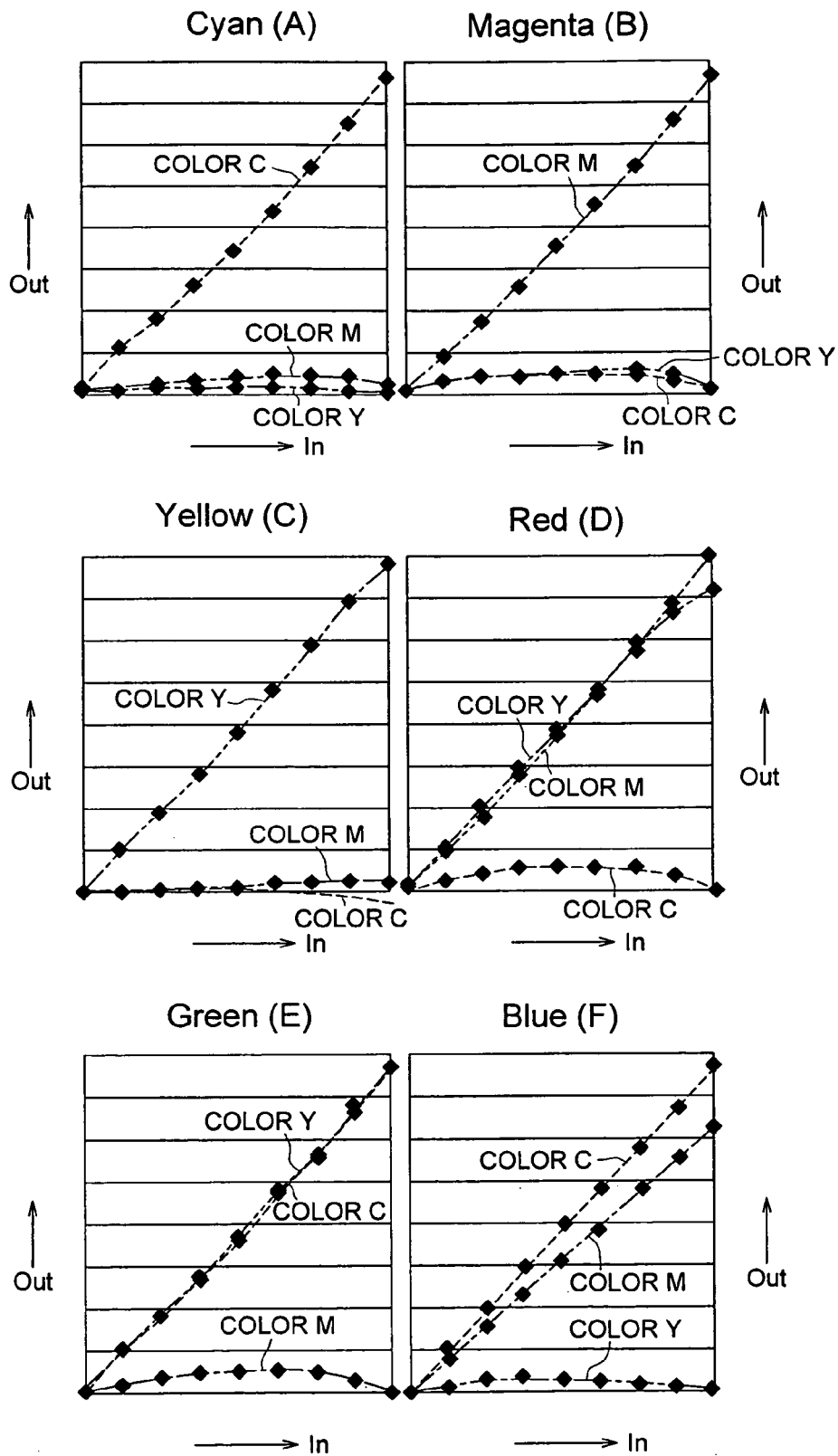
FIGS. 30(A)-30(F) are diagrams showing an example of input-output conversion of the six fundamental colors in the conventional example 2.
Figure 31:
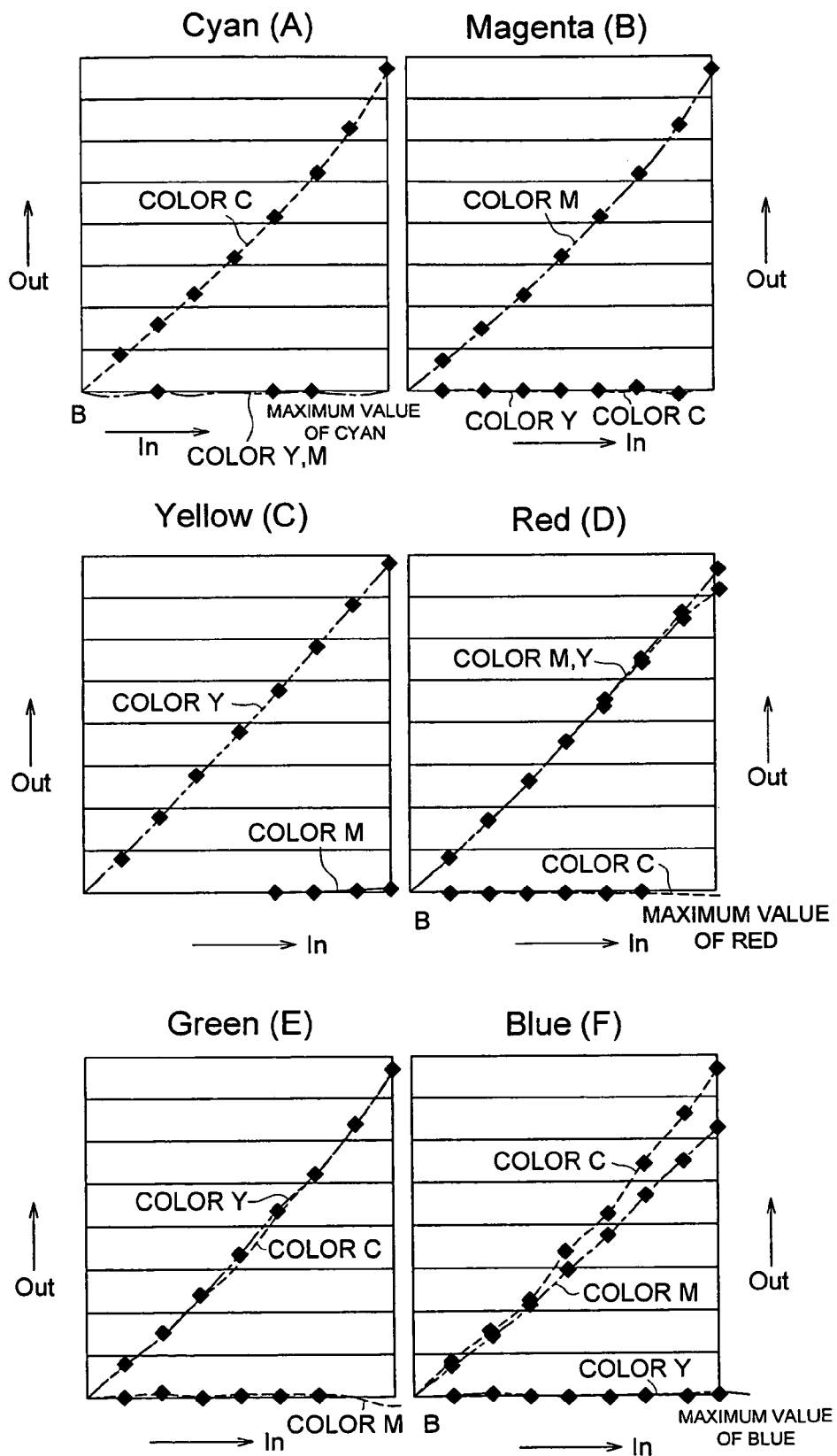
FIGS. 31(A)-31(B) are diagrams showing an example of input-output conversion of the six fundamental colors in the present preferred embodiment.

The colors of this type of color patches are measured in Step G3. Color measurement data is obtained for the colors CMYRGB from this color measurement. Next, in Step G4 the input values of the color patch when the fundamental color gradations have been converted and the CMYK output values are plotted in the form of a graph. At this time, as is shown in FIG. 28, the graph is plotted by replacing the sample numbers 1 to 9 with input values of 0 (white) to 8 (maximum value) which are taken along the horizontal axis, and the measured values, for example, the density is plotted along the vertical axis. In this example, the output values of C, M, Y, and K are indicated in percentage values. In addition, the output of the CMYK values during bland (maximum density) are measured beforehand, and these measured values are stored in the memory.

After that, in Step G5, an evaluation reference point is set in the graph, and verification is done as to whether or not the color mixing component in a fundamental color is below a prescribed value. In the graph described above, the density of the color causing color mixing is checked to see if it is, for example, less than or equal to 10% of the CMYK value of the density at the time of forming a bland (maximum density) patch. In the example shown in FIG. 28, it is clear that the density of the color causing color mixing is almost 6% of the CMYK value of the density at the time of bland (maximum density) patch formation.

In FIG. 28, the horizontal axis is the input value (white to maximum red). The vertical axis is the output value of the C, M, Y, and K colors (%). Of course, the use of the vertical axis need not be limited to these output values, but can also be used to represent the amounts of toner of the colors C, M, Y, and K, density, chroma, or 8-bit output values expressed as a particular percentage. For example, the 8-bit value of 255 gradations is taken as 100% and the 8-bit value 0 is taken as 0%.

In FIG. 28, the single dot and dash line indicating the color M and the double dot and dash line indicating the color Y are almost parallel, and the color R is being reproduced. Although the color C indicated by a wavy line is bent, its density has been suppressed to below 10%. From this, it is possible to evaluate the extent of color mixing with respect to the color R (fundamental color). In the reproduction of fundamental color gradations converted using this type of color conversion method, the colors other than the fundamental color being reproduced (the colors MYK in the case of gradations of the color C, the colors CK in the case of gradations of the color R) can be suppressed to below a prescribed level. The term prescribed level here is less than 10% of the maximum density of the color (can also be the saturation a* or b*) that has been output with 255 gradations in the case of an 8-bit output, and preferably within 5%, and hence it was clear that the color reproduction is excellent.

FIG. 29(A) to FIG. 29(F) and FIG. 30(A) to FIG. 30(F) are drawings showing examples of input-output conversions of the six fundamental colors in the comparison examples of the conventional example 1 and the conventional example 2, respectively. All these graphs have nonlinearity.

In the case of reproducing the color C in the conventional example 1 shown in FIG. 29(A), the color Y is mixed in the base of color K. In the case of reproducing the color M in the conventional example 1 shown in FIG. 29(B), the color C is mixed. In the case of reproducing the color Y in the conventional example 1 shown in FIG. 29(C), the color C is mixed. Further, although there is no color mixing in the case of reproducing the color R in the conventional example 1 shown in FIG. 29(D), reproducing the color G in the conventional example 1 shown in FIG. 29(E), and reproducing the color B in the conventional example 1 shown in FIG. 29(F), the graphs are non-linear.

FIG. 30(A) to FIG. 30(F) are drawings showing examples of color mixing for the colors CMYRGB in the case of the conventional example 2 in which only fundamental color adjustment has been made. The conventional example 2 moves only the maximum gradations Max in "formation of the CMY→Lab3D-LUT by adjustment of fundamental colors", and linear interpolation is made in other cases. All the graphs are non-linear.

In the case of reproducing the color C in the conventional example 2 shown in FIG. 30(A), although color mixing of the color Y has been suppressed, color mixing of the color M is present. In the case of reproducing the color M in the conventional example 2 shown in FIG. 30(B), color mixing is present of the colors Y and C. In the case of reproducing the color Y in the conventional example 2 shown in FIG. 30(C), color mixing of the colors M and C has been suppressed. In the case of reproducing the color R in the conventional example 2 shown in FIG. 30(D), color mixing of the color C is present. In the case of reproducing the color G in the conventional example 2 shown in FIG. 30(E), color mixing of the color M is present. In the case of reproducing the color B in the conventional example 2 shown in FIG. 30(F), color mixing of the color Y is present.

FIG. 31(A) to FIG. 31(F) are drawings showing the input-output conversion examples for the six fundamental colors according to the present preferred embodiment. All the graphs have linearity. In the present preferred embodiment, not only the maximum gradations Max are moved, but also the gradations of the fundamental colors are moved.

In the case of reproducing the color C in the present preferred embodiment shown in FIG. 31(A), the color mixing of the colors Y and M has been suppressed to zero, and color mixing has been improved greatly compared to the conventional example 2. In the case of reproducing the color M in the present preferred embodiment shown in FIG. 31(B), the color mixing of the colors Y and C has been suppressed to zero, and color mixing has been improved greatly compared to the conventional example 2.

In the case of reproducing the color Y in the present preferred embodiment shown in FIG. 31(C), the color mixing of the colors C and M has been suppressed to zero, and color mixing has been improved greatly compared to the conventional example 2. In the case of reproducing the color R in the present preferred embodiment shown in FIG. 31(D), the color mixing of the color C has been suppressed to zero, and color mixing has been improved greatly compared to the conventional example 2. In the case of reproducing the color G in the present preferred embodiment shown in FIG. 31(E), the color mixing of the color M has been suppressed to zero, and color mixing has been improve greatly compared to the conventional example 2. In the case of reproducing the color B in the present preferred embodiment shown in FIG. 31(F), the color mixing of the color Y has been suppressed to zero, and color mixing has been improve greatly compared to the conventional example 2.

As described above, by moving the calculation target point for every gradation of the fundamental colors, during the reproduction of the color R, the color C does not get mixed and the color is formed only the colors M and Y, and hence the reproduction (output) can be made purely (high accuracy) of the red color. Beautiful appearance has been obtained because there is no color mixing. In addition, it has been possible to reduce the wasteful consumption of toners.

According to the information generation apparatus of the present preferred embodiment, it is possible to establish correspondence between the color gamut of the input system color image signals and the color gamut of the output system color image signals for all the gradations of the fundamental colors including the maximum gradations of those fundamental colors.

Therefore, it is possible to eliminate color mixing of the fundamental color gradations compared to the case of correcting the calculation target point by moving the positions of the maximum gradations of the fundamental colors of the output system to the positions of the maximum gradations of the fundamental colors of the input system and then carrying out linear interpolation of the positions other than the maximum gradations. Because of this, it is possible to reproduce colors without color mixing not only in the case of fundamental colors but also in the case of colors other than the fundamental colors.

According to a recording medium of the present preferred embodiment, it is possible to carry out color conversion of M input system color signals to N output system color signals without color mixing.

According to an image processing apparatus according to the present preferred embodiment, since a recording medium according to the preferred embodiment has been provided, it is possible to carry out color conversion of M input system color signals to N output system color signals without color mixing. Because of this, it is possible to provide an image processing apparatus that can reproduce color images of a high quality. In addition, since there is no color mixing, it is possible to reduce the toner consumption.

An embodiment of the present invention is ideally suitable for application to color printers or color copying machines provided with a three dimensional color conversion table, or to color all-in-one units.

While the preferred embodiments of the present invention have been described using specific terms, such description is for illustrative purpose only, and it is to be understood that changes and variations may be made without departing from the spirit or scope of the appended claims.

What is claimed is:

1. A method of using an image processing apparatus for generating a color conversion table for converting M color signals of an input system into N color signals of an output system, comprising the processor steps of:

correcting, for each fundamental color, a calculation target point by moving a position, on chromatic coordinates, of the maximum gradation of the fundamental color of the output system to a position, on the chromatic coordinates, of the maximum gradation of fundamental color of the input system; and correcting, for each gradation other than the maximum gradation of each fundamental color, a calculation target point of the fundamental color of the output system by moving a position, on the chromatic coordinates, of the gradation of the fundamental color of the output system to a position, on the chromatic coordinates, of the gradation of the fundamental color of the input system wherein correcting, for each fundamental color, is performed by calculating a first moving distance by obtaining a difference between the position of the maximum gradation of the fundamental color of the output system and the position of the maximum gradation of the fundamental color of the input system; and wherein correcting, for each gradation other than the maximum gradation of each fundamental color, is performed by calculating a second moving distance by obtaining a difference between a position of the gradation of the fundamental color of the output system and a position of the gradation of the fundamental color of the input system.

2. The method of using an image processing apparatus for generating a color conversion table of claim 1, wherein the color signals of the input system are image signals of red, green and blue, and the color signals of the output system are image signals of cyan, magenta, yellow and black.

3. An information generating apparatus for generating a color conversion table to be used for converting M color signals of an input system into N color signals of an output system, comprising:

a correction section which corrects, for each fundamental color, a calculation target point by moving a position, on chromatic coordinates, of the maximum gradation of the fundamental color of the output system to a position, on the chromatic coordinates, of the maximum gradation of the fundamental color of the input system and corrects, for each gradation other than the maximum gradation of each fundamental color, a calculation target point of the fundamental color of the output system by moving a position, on the chromatic coordinates, of the gradation of the fundamental color of the output system to a position, on the chromatic coordinates, of the gradation of the fundamental color of the input system, wherein the correction section is configured to:

calculate, for each fundamental color, a first moving distance by obtaining a difference between the position of the maximum gradation of the fundamental color of the output system and the position of the maximum gradation of the fundamental color of the input system; and calculate, for each gradation other than the maximum gradation of each fundamental color, a second moving distance by obtaining a difference between a position of the gradation of the fundamental color of the output system and a position of the gradations of the fundamental color of the input system.

4. The information generating apparatus of claim 3, wherein the color signals of the input system are image signals of red, green and blue, and the color signals of the output system are image signals of cyan, magenta, yellow and black.

5. A computer-readable storage medium storing a color conversion table and a plurality of instructions that, when executed by an image processing apparatus, are configured to convert M color signals of an input system into N color signals of an output system;

wherein the color conversion table is obtained based on a calculation target point corrected by moving a position, on chromatic coordinates, of the maximum gradation of each fundamental color of the output system to a position, on the chromatic coordinates, of the maximum gradation of the fundamental color of the input system, and based on calculation target points corrected for gradations other than the maximum gradation of each fundamental color by moving positions, on the chromatic coordinates, of the gradations of the fundamental color in output system to the positions, on the chromatic coordinates, of the gradations of the fundamental color in the input system;

wherein the calculation target point of each fundamental color is corrected by calculating a first moving distance by obtaining a difference between the position of the maximum gradation of the fundamental color of the output system and the position of the maximum gradation of the fundamental color of the input system; and wherein the calculation target point of each gradation other than the maximum gradation of each fundamental color is corrected by calculating a second moving distance by obtaining a difference between a position of the gradation of the fundamental color of the output system and a position of the gradation of the fundamental color of the input system.

6. An image processing apparatus, comprising:

the computer-readable storage medium of claim 5 for storing the color conversion table; and a processing section configured to convert M color signals of an input system into N color signals of an output system based on information stored in the color conversion table.

* * * * *